United States Patent
Wensley et al.

(10) Patent No.: US 10,826,108 B2
(45) Date of Patent: Nov. 3, 2020

(54) HIGH MELT TEMPERATURE MICROPOROUS LITHIUM-ION RECHARGEABLE BATTERY SEPARATORS AND METHODS OF PREPARATION AND USE

(75) Inventors: C. Glen Wensley, Rock Hill, SC (US); Carlos R. Negrete, Huntersville, NC (US); Jill V. Watson, Lake Wyle, SC (US)

(73) Assignee: Celgard, LLC, Charlotte, NC (US)

(*) Notice: Subject to any disclaimer, the term of this patent is extended or adjusted under 35 U.S.C. 154(b) by 287 days.

(21) Appl. No.: 13/193,665

(22) Filed: Jul. 29, 2011

(65) Prior Publication Data
US 2012/0177976 A1    Jul. 12, 2012

Related U.S. Application Data

(60) Provisional application No. 61/369,907, filed on Aug. 2, 2010, provisional application No. 61/369,959, filed on Aug. 2, 2010.

(51) Int. Cl.
| | | |
|---|---|---|
| *H01M 10/05* | (2010.01) | |
| *H01M 2/14* | (2006.01) | |
| *H01M 2/16* | (2006.01) | |
| *H01M 10/0525* | (2010.01) | |

(52) U.S. Cl.
CPC ....... *H01M 10/0525* (2013.01); *H01M 2/145* (2013.01); *H01M 2/166* (2013.01); *H01M 2/1646* (2013.01); *H01M 2/1653* (2013.01); *H01M 2/1686* (2013.01)

(58) Field of Classification Search
None
See application file for complete search history.

(56) References Cited

U.S. PATENT DOCUMENTS

| | | | | |
|---|---|---|---|---|
| 4,217,404 A | * | 8/1980 | Verzwyvelt | .................... 429/206 |
| 4,779,634 A | | 10/1988 | Durocher et al. | |
| 5,543,212 A | * | 8/1996 | Oosedo | ................. B29C 70/083 |
| | | | | 442/319 |
| 6,245,270 B1 | * | 6/2001 | Mizutani | ................ D01D 5/247 |
| | | | | 264/154 |
| 6,335,114 B1 | * | 1/2002 | Ueshima | ............. H01M 2/0285 |
| | | | | 429/161 |
| 8,137,852 B2 | | 3/2012 | Hirano et al. | |
| 8,906,538 B2 | | 12/2014 | Nishikawa | |
| 8,932,748 B2 | * | 1/2015 | Kikuchi | .................. B32B 27/32 |
| | | | | 429/145 |
| 9,023,534 B2 | * | 5/2015 | Nakamori | .............. B01D 71/64 |
| | | | | 429/247 |
| 9,257,706 B2 | * | 2/2016 | Lee | ...................... H01M 8/0213 |
| 2002/0098417 A1 | * | 7/2002 | Gao et al. | ..................... 429/339 |
| 2002/0172755 A1 | * | 11/2002 | Gonzalez | ............ H01M 4/0404 |
| | | | | 427/58 |
| 2005/0277026 A1 | | 12/2005 | Nishikawa et al. | |
| 2007/0020525 A1 | | 1/2007 | Kim et al. | |
| 2007/0066741 A1 | * | 3/2007 | Donovan | ................ C08L 79/08 |
| | | | | 524/430 |
| 2007/0099072 A1 | * | 5/2007 | Hennige | ............... H01M 2/145 |
| | | | | 429/144 |
| 2007/0178376 A1 | | 8/2007 | Fujikawa et al. | |
| 2007/0238017 A1 | | 10/2007 | Call et al. | |
| 2007/0287062 A1 | * | 12/2007 | Tsukuda | .................. H01G 9/02 |
| | | | | 429/129 |
| 2008/0076017 A1 | | 3/2008 | Takezawa et al. | |
| 2009/0008142 A1 | | 1/2009 | Shimizu et al. | |
| 2009/0142567 A1 | * | 6/2009 | Kanakarajan | ............. B32B 5/26 |
| | | | | 428/220 |
| 2009/0142657 A1 | * | 6/2009 | Yen | ............................... 429/145 |
| 2010/0316912 A1 | * | 12/2010 | Hashimoto | .............. H01G 9/02 |
| | | | | 429/254 |
| 2012/0177976 A1 | | 7/2012 | Wensley et al. | |

FOREIGN PATENT DOCUMENTS

| | | | | | |
|---|---|---|---|---|---|
| GB | 2038206 | * | 7/1980 | .............. | B05D 5/00 |
| JP | 2006-054127 | | 2/2006 | | |
| JP | 2006-059733 | * | 3/2006 | .............. | H01G 9/00 |
| JP | 2006059733 A | | 3/2006 | | |
| JP | 2009-205955 | | 9/2009 | | |
| JP | 2009-205956 | | 9/2009 | | |
| JP | 2010-149011 | | 7/2010 | | |
| WO | WO 2007/013552 A1 | * | 2/2007 | ............. | B01D 71/64 |
| WO | WO 2007/049568 | * | 5/2007 | ............. | H01M 2/16 |
| WO | WO 2008/062727 A1 | | 5/2008 | | |
| WO | WO 2009/044227 A1 | | 4/2009 | | |

* cited by examiner

*Primary Examiner* — Jonathan Crepeau
*Assistant Examiner* — Angela J Martin
(74) *Attorney, Agent, or Firm* — Hammer & Associates, P.C.

(57) ABSTRACT

Disclosed or provided are high melt temperature microporous Lithium-ion rechargeable battery separators, shutdown high melt temperature battery separators, battery separators, membranes, composites, and the like that preferably prevent contact between the anode and cathode when the battery is maintained at elevated temperatures for a period of time, methods of making, testing and/or using such separators, membranes, composites, and the like, and/or batteries, Lithium-ion rechargeable batteries, and the like including one or more such separators, membranes, composites, and the like.

20 Claims, 21 Drawing Sheets

Schematic of Coating Process and Film Path

Hot ER Thermogram Schematic

Diagram of Hot Tip Hole Propagation Test.

FIG. 5  Hot Electrical Resistance (Hot ER) Thermogram of Control Sample and Examples 1-4.

Hot Tip Hole Propagation Test Digital Images for Control Sample and Examples 1-5.

SEM Micrograph Showing Surface View at 5,000x Magnification of Example 4.

SEM Micrograph Showing Cross Sectional View at 10,000x magnification of Example 4.

SEM Micrograph Showing Surface View at 5,000x Magnification of Example 3.

SEM Micrograph Showing Cross Sectional View at 5,000x Magnification of Example 3.

SEM Micrograph Showing Cross Section View at 5,200 Magnification of Porous Coating for Example 5.

FIG. 12    e-TMA of Control Sample and Examples 6 and 2.

FIG. 13 Hot ER of Control and Examples 6 and 2.

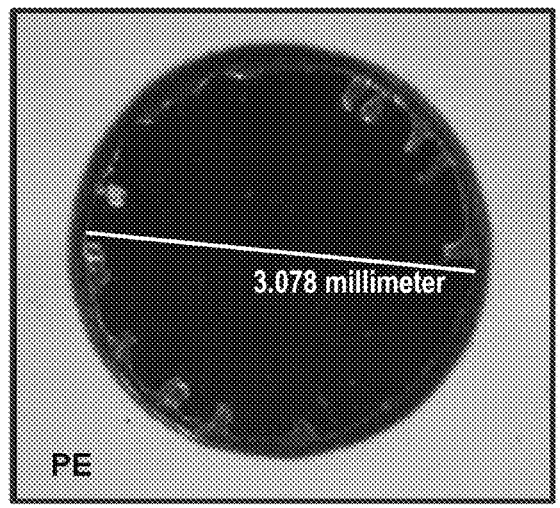
Control (hole size = 3.4 mm)
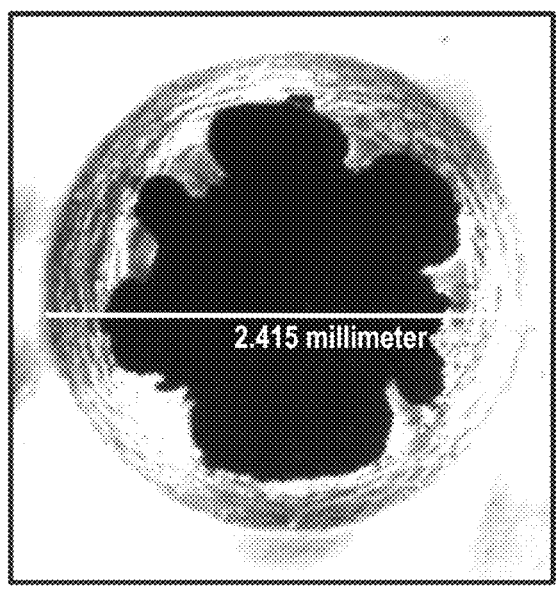
Example 6 (hole size = 2.3 mm)
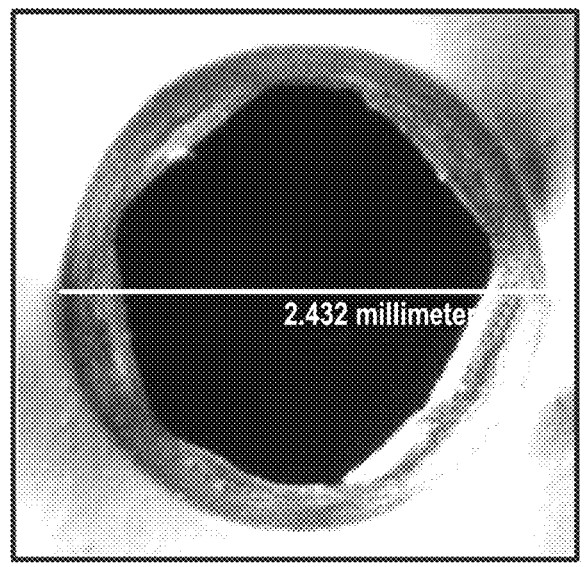
Example 2 (hole size = 2.4 mm)
Hot Tip Digital Images of 16 μm Control Sample and Examples 6 and 2
FIG. 14

SEM micrograph of Example 6 at Magnification of 20,000x.

SEM micrograph of Cross Section Views of Example 6.
at Magnification of 830x (left image) and 2,440x (right image)

SEM Micrograph of Surface View at 20,000x magnification of Example 2.

SEM Micrograph of Cross Section Views of Example 2
at magnification of 2,980x (left image) and 13,300x (right image)

SEM Micrograph Additional View of Cross Section Views of Example 2 a magnification of 4,380x (left image) and 12,100x (Right image)

Schematic of an Electrospinning Device Showing Polymer Solution being Spun into an Electrified Jet of Fiber.

SEM Micrograph of PBI Electrospun
Coating at 5,000x Magnification.

SEM Micrograph of PBI Electrospun
Coating at 20,000x Magnification.

Hot Tip Hole Propagation Control Sample. Hole Diameter is 2.96mm.

Hot Tip Hole Propagation 1-side PBI Coated. Hole Diameter = 0.68 mm.

Hot Tip Hole Propagation 2-side PBI Coated. Hole Diameter = 0.595 mm.

Hot Tip Hole Propagation Celgard® 3401.
Hole Diameter = 3.7 mm.

Hot Tip Hole Propagation 2-side PBI Coated Celgard® 3401.
Hole Diameter = 0.596 mm.

HIGH MELT TEMPERATURE MICROPOROUS LITHIUM-ION RECHARGEABLE BATTERY SEPARATORS AND METHODS OF PREPARATION AND USE

RELATED APPLICATIONS

This application is a U.S. Application which claims priority to and the benefit of U.S. Provisional Patent App. No. 61/369,907, filed Aug. 2, 2010, and U.S. Provisional Application No. 61/369,959, filed Aug. 2, 2010, which is hereby incorporated herein by reference in its entirety.

FIELD OF THE INVENTION

The invention is directed to high melt temperature microporous battery separators, high melt temperature microporous Lithium-ion rechargeable battery separators, shutdown battery separators, battery separators, membranes, composites, components, and the like that preferably prevent contact between the anode and cathode when the battery is maintained at elevated temperatures for a period of time, to methods of making, testing and/or using such separators, membranes, composites, components, and the like, and/or to Lithium-ion batteries, Lithium-ion rechargeable batteries, batteries, and the like including one or more such separators, membranes, composites, and the like. At least selected embodiments are directed to high melt temperature coated microporous Lithium-ion rechargeable battery separators, to high melt temperature microporous Lithium-ion rechargeable electrospun coated battery separators, electrospun separator membranes, and the like, to methods of making and/or using such coated separators, electrospun coated separators, electrospun separator membranes, and the like, and/or to Lithium-ion rechargeable batteries including one or more such coated separators, electrospun coated separators, separator membranes, and the like.

BACKGROUND OF THE INVENTION

Manufacturers of Lithium-ion batteries strive to produce Lithium-ion rechargeable batteries that shutdown under certain extreme conditions and at high temperatures.

Although battery separators are well known, such as high quality, polyolefin, Lithium-ion rechargeable battery separators manufactured and sold by Celgard, LLC of Charlotte, N.C., there is a need for improved or novel battery separators for at least certain extreme conditions, high temperatures, high melt temperature microporous battery separators, high melt temperature microporous Lithium-ion rechargeable battery separators, membranes, composites, components, and the like that preferably prevent contact between the anode and cathode when the battery is maintained at elevated temperatures for a period of time, methods of making, testing and/or using such separators, membranes, composites, components, and the like, and/or Lithium-ion batteries, Lithium-ion rechargeable batteries, batteries, and the like including one or more such separators, membranes, composites, and the like.

Also, there is a need for improved or novel battery separators for at least certain high temperature applications, for high melt temperature coated microporous Lithium-ion rechargeable battery separators, high melt temperature microporous Lithium-ion rechargeable electrospun coated battery separators, electrospun separator membranes, and the like, to methods of making and/or using such coated separators, electrospun coated separators, electrospun separator membranes, and the like, and/or to Lithium-ion rechargeable batteries including one or more such coated separators, electrospun coated separators, electrospun separator membranes, and the like.

SUMMARY OF THE INVENTION

At least certain embodiments of the present invention may address the need for improved or novel battery separators for at least certain extreme conditions, high temperatures, high melt temperature microporous battery separators, high melt temperature microporous Lithium-ion (Li-ion) rechargeable battery separators, battery separators, membranes, films, composites, and the like that preferably prevent contact between the anode and cathode when the battery is maintained at elevated temperatures for a period of time, methods of making, testing and/or using such separators, membranes, composites, components, and the like, and/or Lithium-ion batteries, Lithium-ion rechargeable batteries, other batteries, and the like (including batteries, cells, packs, accumulators, capacitors, or the like) including one or more such separators, membranes, composites, and/or the like. Such Lithium-ion batteries, or other batteries, cells, packs, or the like may be of any shape, size and/or configuration, such as cylindrical, flat, rectangular, large scale such as large scale Electric Vehicle (EV), prismatic, button, envelope, box, and/or the like.

At least selected embodiments of the invention are directed to high melt temperature microporous Lithium-ion rechargeable battery separators, membranes, films, composites, components, and the like that preferably prevent contact between the anode and cathode when the battery is maintained at elevated temperatures for a period of time, to methods of making, testing and/or using such separators, membranes, composites, components, and the like, and/or to Lithium-ion rechargeable batteries including one or more such separators, membranes, composites, and/or the like.

At least certain embodiments are directed to improved or novel battery separators for at least certain high temperature applications, to high melt temperature coated microporous Lithium-ion rechargeable battery separators, to high melt temperature microporous Lithium-ion rechargeable electrospun coated battery separators, to electrospun separator membranes, to methods of making and/or using such coated separators, electrospun separators, electrospun membranes, and/or to Lithium-ion rechargeable batteries including one or more such coated separators, electrospun coated separators, electrospun separator membranes, and/or the like.

Manufacturers of Lithium-ion batteries are striving to achieve a Lithium-ion rechargeable battery that is capable of at least partial functioning at high temperatures (for example, at about 160 degrees Centigrade (deg C) or Celsius, preferably at about 180 deg C., more preferably at about 200 deg C., most preferably at about 220 deg C. or higher) for at least a short period of time. Such partial functioning preferably includes at least keeping the electrodes (anode and cathode) physically separated at high temperatures for at least a short period of time, and may also include shutdown or shut down, full shutdown, partial shutdown, allowing or providing at least partial ionic flow between the electrodes, or even full ionic flow. For example, one layer of the separator may shutdown at about 130 deg C., but another layer of the separator preferably keeps the electrodes (anode and cathode) physically separated for at least 5 minutes, preferably 15 minutes, and more preferably for 60 minutes, at about 160 deg C., preferably at about 180 deg C., more preferably at about 200 deg C., most preferably at about 220 deg C. or higher, this is partial functioning at high temperature. In another embodiment, a possibly preferred separator keeps the electrodes (anode and cathode) physically separated for at least 5 minutes, preferably for at least 15 minutes, and more preferably for at least 60 minutes, and provides full shutdown (no ionic flow) between the electrodes at about 160 deg C. (for example, shuts down at 130 deg C.). In another embodiment, a possibly preferred separator keeps the electrodes (anode and cathode) physically separated for at least 5 minutes, preferably for at least 15 minutes, and more preferably for at least 60 minutes, at about 180 deg C. In another embodiment, a possibly preferred separator keeps the electrodes (anode and cathode) physically separated for at least 5 minutes, preferably for at least 15 minutes, and more preferably for at least 60 minutes, at about 200 deg C. In another embodiment, a possibly most preferred separator keeps the electrodes (anode and cathode) physically separated for at least 5 minutes, preferably for at least 15 minutes, and more preferably for at least 60 minutes, at about 250 deg C. or more.

A possibly preferred high temperature separator has at least one layer or component that has a high melt temperature, preferably >160 deg C., more preferably >180 deg C., still more preferably >200 deg C., and most preferably >220 deg C., and has a high level of dimensional or structural integrity needed to prevent contact between the anode and cathode when the battery is maintained at elevated temperatures for a period of time, preferably for at least 5 minutes, more preferably for at least 15 minutes, and still more preferably for at least 60 minutes, and may optionally preferably shutdown at 130 deg C.

A possibly more preferred high temperature separator has a high melt temperature, preferably >180 deg C. and more preferably >200 deg C., and has a high level of dimensional or structural integrity needed to prevent contact between the anode and cathode when the battery is maintained at elevated temperatures for a period of time.

A possibly most preferred high temperature separator has at least one layer including a polymer with a glass transition temperature (Tg) of about 250 deg C. or more (a high Tg polymer) and with a Tg suppression in electrolyte of about 50 deg C. or less (an effective Tg of about 200 deg C. or more in electrolyte), and has at least one layer having a high level of dimensional or structural integrity sufficient to prevent contact between the anode and cathode when the battery is maintained at elevated temperatures for a period of time. The high Tg polymer should also be dissolvable in at least one solvent or solvent mixture, and preferably the high Tg polymer is soluble in at least one moderately volatile solvent, such as DMAc.

In accordance with at least certain embodiments, it is highly desirable to have a high melt temperature separator with at least one layer having a high level of dimensional or structural integrity (preferably both) sufficient to prevent contact between the anode and cathode when the battery is maintained at elevated temperatures, preferably >160 deg C., more preferably >180 deg C., still more preferably >200 deg C., and most preferably >220 deg C., for a period of time, preferably for at least 5 minutes, more preferably for at least 15 minutes, and still more preferably for at least 60 minutes, and may optionally provide shut-down, preferably at about 120 deg C., more preferably at 125 deg C., most preferably at 130 deg C. Such a separator may be referred to as a high temperature melt integrity (HTMI) separator with shutdown.

In accordance with at least selected embodiments, the possibly preferred inventive separator is either a high melt temperature battery separator including a porous membrane coated with a high glass transition temperature (Tg) polymer or blend (also referred to as a binder when used with filler or particles) on at least one side thereof or a stand alone (single or multi-ply) porous membrane having at least one layer made using a high Tg polymer or blend. Possibly preferred is a non-heat set, high Tg polymer or blend. The high Tg polymer should also be dissolvable in at least one solvent or solvent mixture, and preferably the high Tg polymer is soluble in at least one moderately volatile solvent, such as DMAc.

A possibly most preferred high temperature separator has at least one layer including a high Tg polymer with a glass transition temperature (Tg) of about 250 deg C. or more and with a Tg suppression in electrolyte of about 50 deg C. or less (an effective Tg of about 200 deg C. or more in electrolyte), and has a high level of dimensional or structural integrity needed to prevent contact between the anode and cathode when the battery is maintained at elevated temperatures for a period of time. The preferred high Tg polymer should also be dissolvable in at least one solvent or solvent mixture, and preferably the high Tg polymer is soluble in at least one moderately volatile solvent.

In accordance with selected embodiments, at least one object of the present invention is to provide a high melt temperature microporous Lithium-ion rechargeable battery separator, membrane, film or composite that has at least one layer, component, or coating that is capable of retaining its physical structure up to 200 deg C., preferably up to 250 deg C., in a Lithium-ion rechargeable battery (battery, cell, pack, accumulator, capacitor, or the like) for at least a short period of time. This particular possibly preferred separator, membrane or composite includes at least one layer preferably composed of or including one or more polymers which have an effective glass transition temperature ($T_g$) in electrolyte greater than 160 deg C., more preferably greater than 180 deg C., and most preferably at least 200 deg C. Preferably, the separator, membrane or composite includes a polymer, blend or combination of polymers having a glass transition temperature ($T_g$) of at least 250 deg C., such as but not limited to, polyimidazoles, polybenzimidazole (PBI), polyimides, polyamideimides, polyaramids, polysulfones, aromatic polyesters, polyketones, and/or blends, mixtures, and combinations thereof. The possibly preferred separator, membrane or composite may include or be composed of a single or double sided high Tg polymer microporous coating (with or without high temperature fillers or particles) applied to a microporous base membrane or film. Alternatively, the possibly preferred separator or membrane may be a free standing high Tg polymer microporous separator or membrane (with or without high temperature fillers or particles). Yet another possibly preferred separator, membrane or composite may include at least one high Tg polymer microporous layer (with or without high temperature fillers or particles).

Still yet another preferred separator may include or be composed of an electrospun coated, single or double sided, high Tg polymer microporous coating applied to a microporous base membrane or film. In accordance with at least selected embodiments, a possibly preferred inventive separator is a high melt temperature battery separator consisting of a porous membrane with an electrospun nanofiber coating of a high glass transition temperature (Tg) polymer, preferably Polybenzimidazole (PBI) or a blend of PBI with other polymer or polymers, on at least one side thereof and preferably coated on two sides. Although PBI may be preferred, a blend of PBI with another polymer or other polymers such as polyaramids, polyimides, polyamideimide, polyvinylidene fluoride, co-polymers of polyvinylidene fluoride and blends, mixtures and/or combinations thereof may also be used.

In accordance with selected embodiments, at least one object of the present invention is to provide a high melt temperature coated or electrospun coated microporous Lithium-ion rechargeable battery separator or membrane that is capable of retaining its physical structure up to 250 deg C. in a Lithium-ion rechargeable battery (cell, pack, battery, accumulator, capacitor, or the like) for at least a short period of time. This particular possibly preferred separator or membrane preferably has an electrospun nanofiber coating of polybenzimidazole (PBI) or a blend of PBI with another polymer or other polymers applied to at least one side thereof and preferably coated on two sides of a microporous base membrane. The preferred electrospun nanofiber coating consists of nanoscale PBI fibers which are in the range of 10 to 2,000 nanometers in diameter, preferably 20 to 1,000 nanometers in diameter, more preferably 25 to 800 nanometers in diameter, and most preferably 30 to 600 nanometers in diameter. The preferred targeted basis weight of the nanoscale PBI electrospun coating of the high melt temperature microporous Lithium-ion rechargeable battery separator membrane is 1.0 to 8.0 g/m$^2$ or more, preferably 2.0 to 6.0 g/m$^2$, more preferably 2.2 to 5.0 g/m$^2$, and most preferably 2.5 to 5.0 g/m$^2$. The preferred fibers are smooth when viewed by SEM at 5,000× magnification and are non-porous. The electrospinning process can deposit nanoscale PBI fibers on the surface of a base microporous membrane in a random fashion resembling spaghetti noodles scattered on a surface.

The electrospinning coating approach can coat a high Tg polymer such as PBI or a blend of PBI with another polymer or polymers such as polyaramids, polyimides and polyamideimide and blends, mixtures and/or combinations thereof onto a microporous porous membrane without a detrimental affect to the pore structure or the porosity of the porous base membrane, that is, the nanoscale electrospun fibers do not block the pores of the base membrane. The electrospinning process provides a method of applying a high Tg polymer in the form of nanoscale fibers onto a microporous base membrane without the nanoscale fibers themselves required to be porous. The spaces between the fibers provide the necessary openings or porosity. A process step to form pores in the electrospun nanoscale high Tg polymer fibers is not required. In the electrospinning process, the high Tg polymers or polymers are dissolved in a solvent or solvents. The solvent is evaporated during the formation of the electrospun fibers. Typically, dip coated or gravure coated methods of applying polymers onto a microporous base membrane may require the coated film to be immersed in a bath designed for removing the polymer solvent. The present electrospinning method of applying high Tg polymers onto microporous membranes or for forming stand alone membranes may be simpler than other processes from a manufacturing point of view because an immersion step or extraction step to remove the solvent in order to form a porous structure in the coating is not required. Electrospinning can be a less costly manufacturing process for the application of nanoscale high Tg polymer fibers onto a microporous membrane to produce a high melt temperature microporous Lithium-ion rechargeable battery separator or membrane.

In at least selected separator or membrane embodiments, the high Tg polymer can be coated onto a microporous base membrane made of a thermoplastic polymer provided the high Tg polymer is soluble in at least one moderately volatile solvent. Thermoplastic polymers include, but are not limited to, polyolefins such as polyethylene, polypropylene, polymethylpentene, and/or blends, mixtures, or combinations thereof. Such polyolefin microporous base membranes are available from Celgard, LLC of Charlotte, N.C. The microporous base membranes can be manufactured by, for example, a dry stretch process (known as the Celgard® dry stretch process) of Celgard, LLC of Charlotte, N.C., or by a wet process also known as a phase separation or extraction process of Celgard Korea Inc. of South Korea, Asahi of Japan and Tonen of Japan. The base membrane may be a single layer (one or more plies) of Polypropylene or Polyethylene, or a multi-layer membrane, such as a tri-layer membrane e.g., Polypropylene/Polyethylene/Polypropylene (PP/PE/PP) or Polyethylene/Polypropylene/Polyethylene (PE/PP/PE), bi-layer membrane (PP/PE or PE/PP), or the like.

Some base membranes or films, such as Polypropylene, may require pre-treatment in order to alter the surface characteristics of the membrane and improve the adhesion of the high Tg polymer coating or nanoscale electrospun fibers to one or both sides of the base membrane. Pre-treatments may include, but are not limited to, priming, stretching, corona treatment, plasma treatment, and/or coating, such as surfactant coatings on one or both sides thereof.

BRIEF DESCRIPTION OF DRAWINGS

For the purposes of illustrating the various embodiments or aspects of the invention, there is shown in the drawings a form that is presently exemplary; it being understood, however, that the invention is not limited to the embodiments, precise arrangements or instrumentalities shown.

FIG. 14 are respective Hot Tip Hole propagation digital images of the 16 μm Control Sample and present Examples 6 and 2.

DETAILED DESCRIPTION OF THE INVENTION

Figure 1:
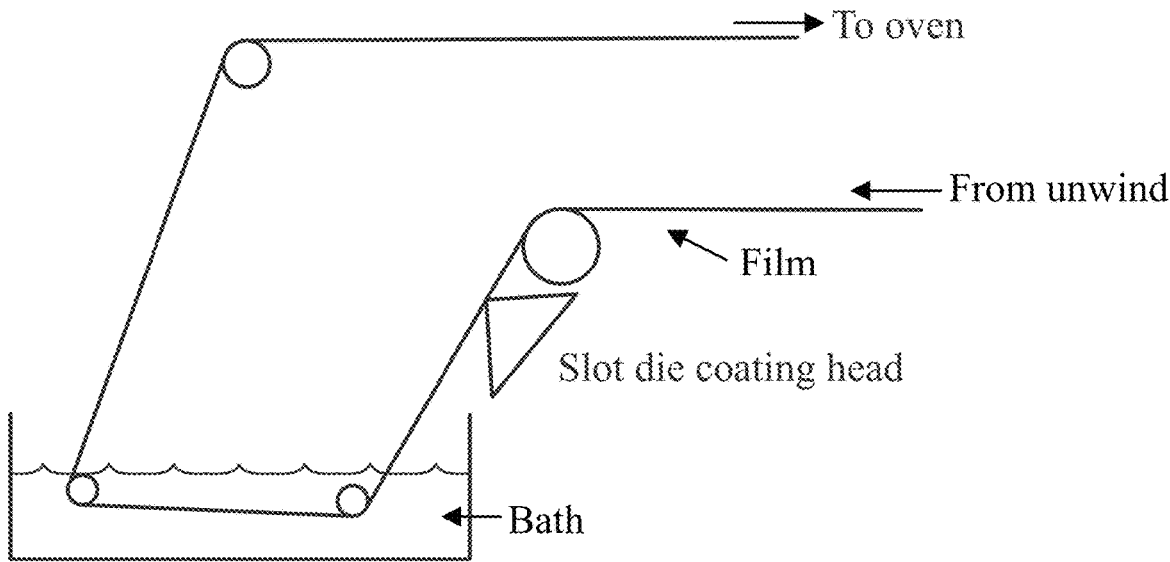
FIG. 1 is a schematic side view of one embodiment of the present coating process and film path.

At least certain embodiments of the present invention may address the need for improved or novel battery separators for at least certain extreme conditions, high temperatures, high melt temperature microporous battery separators, high melt temperature microporous Lithium-ion rechargeable battery separators, battery separators, membranes, films, composites, and the like that preferably prevent contact between the anode and cathode when the battery is maintained at elevated temperatures for a period of time, methods of making, testing and/or using such separators, membranes, composites, components, and the like, and/or Lithium-ion batteries, Lithium-ion rechargeable batteries, other batteries, and the like (including batteries, cells, packs, accumulators, capacitors, or the like) including one or more such separators, membranes, composites, and the like. Such Lithium-ion batteries, or other batteries, cells, packs, or the like may be of any shape, size and/or configuration, such as cylindrical, flat, rectangular, large scale such as large scale Electric Vehicle (EV), prismatic, button, envelope, box, and/or the like.

At least selected embodiments of the invention are directed to high melt temperature microporous Lithium-ion rechargeable battery separators, membranes, composites, components, and the like that preferably prevent contact between the anode and cathode when the battery is maintained at elevated temperatures for a period of time, to methods of making, testing and/or using such separators, membranes, composites, components, and the like, and/or to Lithium-ion rechargeable batteries including one or more such separators, membranes, composites, and the like.

Manufacturers of Lithium-ion batteries are striving to achieve a Lithium-ion rechargeable battery that is capable of at least partial functioning at high temperatures (for example, at about 160 degrees Centigrade (deg C) or Celsius, preferably at about 180 deg C., more preferably at about 200 deg C., most preferably at about 220 deg C. or higher) for at least a short period of time. Such partial functioning preferably includes at least keeping the electrodes (anode and cathode) physically separated at high temperatures for at least a short period of time, and may also include shutdown, full shutdown, partial shutdown, allowing or providing at least partial ionic flow between the electrodes, or even full ionic flow. For example, one layer of the separator may shutdown at about 130 deg C., but another layer of the separator preferably keeps the electrodes (anode and cathode) physically separated for at least 5 minutes, preferably 15 minutes, and more preferably for 60 minutes, at about 160 deg C., preferably at about 180 deg C., more preferably at about 200 deg C., most preferably at about 220 deg C. or higher, this is partial functioning at high temperature. In another embodiment, a possibly preferred separator keeps the electrodes (anode and cathode) physically separated for at least 5 minutes, preferably for at least 15 minutes, and more preferably for at least 60 minutes, and provides full shut-down (no ionic flow) between the electrodes at about 160 deg C. (for example, shuts down at 130 deg C.). In another embodiment, a possibly preferred separator keeps the electrodes (anode and cathode) physically separated for at least 5 minutes, preferably for at least 15 minutes, and more preferably for at least 60 minutes, at about 180 deg C. In another embodiment, a possibly preferred separator keeps the electrodes (anode and cathode) physically separated for at least 5 minutes, preferably for at least 15 minutes, and more preferably for at least 60 minutes, at about 200 deg C. In another embodiment, a possibly most preferred separator keeps the electrodes (anode and cathode) physically separated for at least 5 minutes, preferably for at least 15 minutes, and more preferably for at least 60 minutes, at about 250 deg C. or more.

A possibly preferred high temperature separator has at least one layer, coating or component that has a high melt temperature, preferably >160 deg C., more preferably >180 deg C., still more preferably >200 deg C., and most preferably >220 deg C., and has a high level of dimensional or structural integrity needed to prevent contact between the anode and cathode when the battery is maintained at elevated temperatures for a period of time, preferably for at least 5 minutes, preferably for at least 15 minutes, and more preferably for at least 60 minutes, and may optionally preferably shutdown at 130 deg C.

A possibly more preferred high temperature separator has a high melt temperature, preferably >180 deg C. and more preferably >200 deg C., and has a high level of dimensional or structural integrity needed to prevent contact between the anode and cathode when the battery is maintained at elevated temperatures for a period of time.

A possibly most preferred high temperature separator has at least one layer including a polymer with a glass transition temperature (Tg) of about 250 deg C. or more (a high Tg polymer) and with a Tg suppression in electrolyte of about 50 deg C. or less (an effective Tg of about 200 deg C. or more in electrolyte), and has at least one layer having a high level of dimensional or structural integrity sufficient to prevent contact between the anode and cathode when the battery is maintained at elevated temperatures for a period of time. The high Tg polymer should also be dissolvable in at least one solvent or solvent mixture, and preferably the high Tg polymer is soluble in at least one moderately volatile solvent, such as DMAc.

In accordance with at least certain embodiments, it is highly desirable to have a high melt temperature separator with at least one layer or coating having a high level of dimensional or structural integrity (preferably both) sufficient to prevent contact between the anode and cathode when the battery is maintained at elevated temperatures, preferably >160 deg C., more preferably >180 deg C., still more preferably >200 deg C., and most preferably >220 deg C., for a period of time, preferably for at least 5 minutes, preferably for at least 15 minutes, and more preferably for at least 60 minutes, and may optionally provide shut-down, preferably at about 120 deg C., more preferably at 125 deg C., most preferably at 130 deg C. Such a separator may be referred to as a high temperature melt integrity (HTMI) separator.

In accordance with at least selected embodiments, the possibly preferred inventive separator is either a high melt temperature battery separator including a porous membrane coated with a high glass transition temperature (Tg) polymer or blend (also referred to as a binder when used with filler or particles) on at least one side thereof or a stand alone (single or multi-ply) porous membrane having at least one layer made using a high Tg polymer or blend. Possibly preferred is a non-heat set, high Tg polymer or blend. The high Tg polymer should also be dissolvable in at least one solvent or solvent mixture, and preferably the high Tg polymer is soluble in at least one moderately volatile solvent, such as DMAc.

A possibly most preferred high temperature separator has at least one layer or coating including a high Tg polymer with a glass transition temperature (Tg) of about 250 deg C. or more and with a Tg suppression in electrolyte of about 50 deg C. or less (an effective Tg of about 200 deg C. or more in electrolyte), and has a high level of dimensional or structural integrity needed to prevent contact between the anode and cathode when the battery is maintained at elevated temperatures for a period of time. The preferred high Tg polymer should also be dissolvable in at least one solvent or solvent mixture, and preferably the high Tg polymer is soluble in at least one moderately volatile solvent.

In accordance with selected embodiments, at least one object of the present invention is to provide a high melt temperature microporous Lithium-ion rechargeable battery separator, membrane or composite that has at least one layer or coating that is capable of retaining its physical structure up to 200 deg C., preferably up to 250 deg C., in a Lithium-ion rechargeable battery (battery, cell, pack, accumulator, capacitor, or the like) for at least a short period of time. This particular possibly preferred separator, membrane or composite includes at least one layer or coating preferably composed of or including one or more polymers which have an effective glass transition temperature ($T_g$) in electrolyte greater than 160 deg C., more preferably greater than 180 deg C., and most preferably at least 200 deg C. Preferably, the separator, membrane or composite includes a polymer, blend or combination of polymers having a glass transition temperature ($T_g$) of at least 250 deg C., such as but not limited to, polyimidazoles, polybenzimidazole (PBI), polyimides, polyamideimides, polyaramids, polysulfones, aromatic polyesters, polyketones, and/or blends, mixtures, and combinations thereof. The possibly preferred separator, membrane or composite may include or be composed of a single or double sided high Tg polymer microporous coating (with or without high temperature fillers or particles) applied to a microporous base membrane or film. Alternatively, the possibly preferred separator or membrane may be a free standing high Tg polymer microporous separator or membrane (with or without high temperature fillers or particles). Yet another possibly preferred separator, membrane or composite may include at least one high Tg polymer microporous layer (with or without high temperature fillers or particles).

In at least selected separator or membrane embodiments, the high Tg polymer can be coated onto a microporous base membrane made of a thermoplastic polymer provided the high Tg polymer is soluble in at least one moderately volatile solvent. Thermoplastic polymers include, but are not limited to, polyolefins such as polyethylene, polypropylene, polymethylpentene, and/or blends, mixtures, or combinations thereof. Such polyolefin microporous base membranes are available from Celgard, LLC of Charlotte, N.C. The microporous base membranes can be manufactured by, for example, a dry stretch process (known as the Celgard® dry stretch process) of Celgard, LLC of Charlotte, N.C., or by a wet process also known as a phase separation or extraction process of Celgard Korea Inc. of South Korea, Asahi of Japan and Tonen of Japan. The base membrane may be a single layer (one or more plies) of Polypropylene or Polyethylene, or a multi-layer membrane, such as a tri-layer membrane e.g., Polypropylene/Polyethylene/Polypropylene (PP/PE/PP) or Polyethylene/Polypropylene/Polyethylene (PE/PP/PE), bi-layer membrane (PP/PE or PE/PP), or the like.

Some base membranes or films, such as Polypropylene, may require pre-treatment in order to alter the surface characteristics of the membrane and improve the adhesion of the high Tg polymer coating to one or both sides of the base membrane. Pre-treatments may include, but are not limited to, priming, stretching, corona treatment, plasma treatment, and/or coating, such as surfactant coatings on one or both sides thereof.

At least certain objects of the present invention are directed to battery separators for at least certain extreme conditions, high temperatures, high melt temperature microporous battery separators, high melt temperature microporous Lithium-ion rechargeable battery separators, battery separators, separator membranes, and the like that preferably prevent contact between the anode and cathode when the battery is maintained at elevated temperatures for a period of time, methods of making, testing and/or using such separators, membranes, and the like, and/or Lithium-ion batteries, Lithium-ion rechargeable batteries, batteries, cells, packs, accumulators, capacitors, and the like including one or more such separators, membranes, and the like. Such batteries, cells, packs, or the like may be of any shape, size and/or configuration, such as cylindrical, flat, rectangular, large scale, large scale Electric Vehicle (EV), prismatic, button, envelope, box, wound, folded, z-fold, and/or the like.

At least certain objects of the invention are directed to high melt temperature microporous Lithium-ion rechargeable battery separators, membranes, and the like that preferably prevent contact between the anode and cathode when the battery is maintained at elevated temperatures for a period of time, to methods of making, testing and/or using such separators, membranes, and the like, and/or to Lithium-ion rechargeable batteries including one or more such separators, membranes, and the like.

At least selected embodiments of the invention are directed to high melt temperature microporous Lithium-ion battery separators that preferably prevent contact between the anode and cathode when the battery is maintained at elevated temperatures for a period of time, to methods of making and/or using such separators, and/or to Lithium-ion rechargeable batteries including one or more such separators.

In accordance with selected embodiments, at least one object of the present invention is to provide a high melt temperature microporous battery separator or membrane that is capable of retaining its physical structure up to 250 deg C. in a battery, cell, pack, accumulator, capacitor, or the like. This particular possibly preferred separator or membrane is preferably composed of one or more polymers which have a glass transition temperature ($T_g$) greater than 165 deg C. including, more preferably a polymer, blend or combination which has a glass transition temperature ($T_g$) greater than 180 deg C., most preferably which has a glass transition temperature ($T_g$) greater than 250 deg C., such as but not limited to, polyimidazoles, polybenzimidazole (PBI), polyimides, polyamideimides, polyaramids, polysulfones, aromatic polyesters, polyketones, and/or blends, mixtures, and combinations thereof. The possibly preferred separator or membrane can be composed of a single or double sided high Tg polymer coating applied to a microporous base membrane or can be a free standing high Tg polymer microporous separator or membrane. The high Tg polymer may be filled or unfilled. The high Tg polymer can be coated onto a microporous base membrane made of a thermoplastic polymer and preferably the high Tg polymer is soluble in at least one moderately volatile solvent. Thermoplastic polymers include, but are not limited to, polyolefins such as polyethylene, polypropylene, polymethylpentene, and blends, mixtures, or combinations thereof. The base membrane may be a single layer (one or more plies) or multi-layer membrane, such as a tri-layer membrane e.g., Polypropylene/Polyethylene/Polypropylene (PP/PE/PP) or Polyethylene/Polypropylene/Polyethylene (PE/PP/PE), bi-layer membrane (PP/PE or PE/PP), or the like.

Some base membranes or films, such as Polypropylene, may require pre-treatment in order to alter the surface characteristics of the membrane and improve the adhesion of the high Tg polymer coating to the base membrane. Pre-treatments may include, but are not limited to, priming, stretching, corona treatment, plasma treatment, and/or coating, such as surfactant coatings on one or both sides thereof.

In accordance with at least one embodiment, an object of the invention is to provide a high melt temperature microporous separator that is capable of retaining its physical structure up to 250 deg C. in a high temperature battery.

In accordance with at least selected embodiments, the high Tg polymer may be applied in a coating solution by a coating slot die (see FIG. 1), a doctor blade, a Meyer rod, or a direct or reverse gravure type roll. A coating solution may be prepared by dissolving the high $T_g$ polymer in a suitable solvent, for example, Dimethylacetamide (DMAc), N-methylpyrrolidinone, 1,4 dioxane, acetone, etc. The coating solution may further contain 1) a non-solvent for the high Tg polymer, 2) a cross linking agent such as a dihalide, dialdehyde or acid dichloride, 3) a surfactant to improve coating uniformity, 4) inorganic particles such as $Al_2O_3$, $TiO_2$, $CaCO_3$, $BaSO_4$, silica carbide, boron nitride, or 5) organic polymers such as powdered PTFE, or other chemically inert, small (preferably less than 2 microns, more preferably less than 1 micron), dry, and high melt temperature.

Following application of the high Tg polymer, the membrane may be immersed in a gelation bath (see FIG. 1). The gelation bath may consist of a single bath comprised of a non-solvent or a mixture of non-solvents or the gelation bath may consist of a series of baths which include mixtures of a solvent and one or more non-solvents. In the case where the coating operation consists of a series of baths, the final bath should consist of a non-solvent or mixtures of non-solvents. It should be noted that the distance between the coating die and the gelation bath should be minimized in order to prevent contact of the coating mixture with the air. The bath may be at room temperature, below room temperature or at an elevated temperature.

The gelation bath step serves to precipitate the high Tg polymer onto the base membrane, remove the polymer solvent (or solvents) and create the porous structure in the high Tg polymer coating or layer. The choice of bath composition and the temperature of the bath controls the rate of precipitation of the polymer and the porosity and pore structure of the porous coating or layer formed on the base membrane, film or carrier.

The coated membrane, film or carrier may then be dried in an oven and can be dried on a tenter frame to prevent shrinkage or curling of the film. The final high Tg polymer coating or layer thickness may preferably be 1-20 µm with the coated microporous membrane or separator having a total thickness of preferably 5-40 µm. In at least certain possibly preferred embodiments, it may be preferred to have a coating of at least about 4 µm, preferably at least about 6 µm, more preferably at least about 8 µm on at least one side, preferably on both sides, of a polyolefin microporous membrane to form an HTMI separator.

Another possibly preferred inventive separator is an electrospun coated microporous battery separator, having an electrospun nanofiber coating of a high glass transition temperature (Tg) polymer preferably Polybenzimidazole (PBI) on at least one side thereof and preferably coated on two sides (on both sides of the porous base film). Although PBI may be preferred, a blend of PBI with other polymer or polymers such as polyaramids, polyimides, polyamideimide, polyvinyldiene fluoride and co-polymers of polyvinylidene fluoride and blends, mixtures and/or combinations thereof may also be used.

Figure 20:
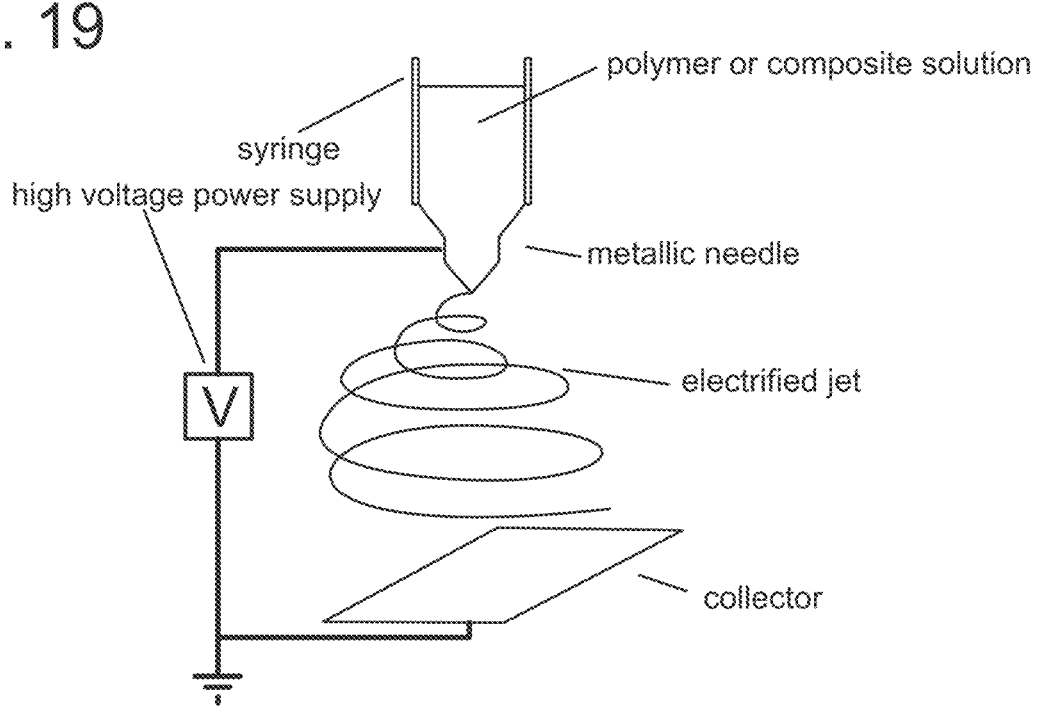
FIG. 20 is a schematic of an electrospinning device showing fiber formation.

Electrospinning is a process that can be used to create polymeric nanofibers in the range of 40-2,000 nm. The electrospinning process uses an electric field to draw a polymer solution from the tip of a capillary to a collector. A schematic of an electrospinning nozzle-type device is shown in FIG. 20. A voltage is applied to the polymer solution which causes a fine stream of the polymer solution to be drawn towards a grounded collector. The fine stream dries to form polymeric fibers which build up a three dimensional fibrous web structure on the collector. Electrospinning can be used to apply a nanofiber polymer coating onto a substrate such as a microporous membrane.

Figure 21:
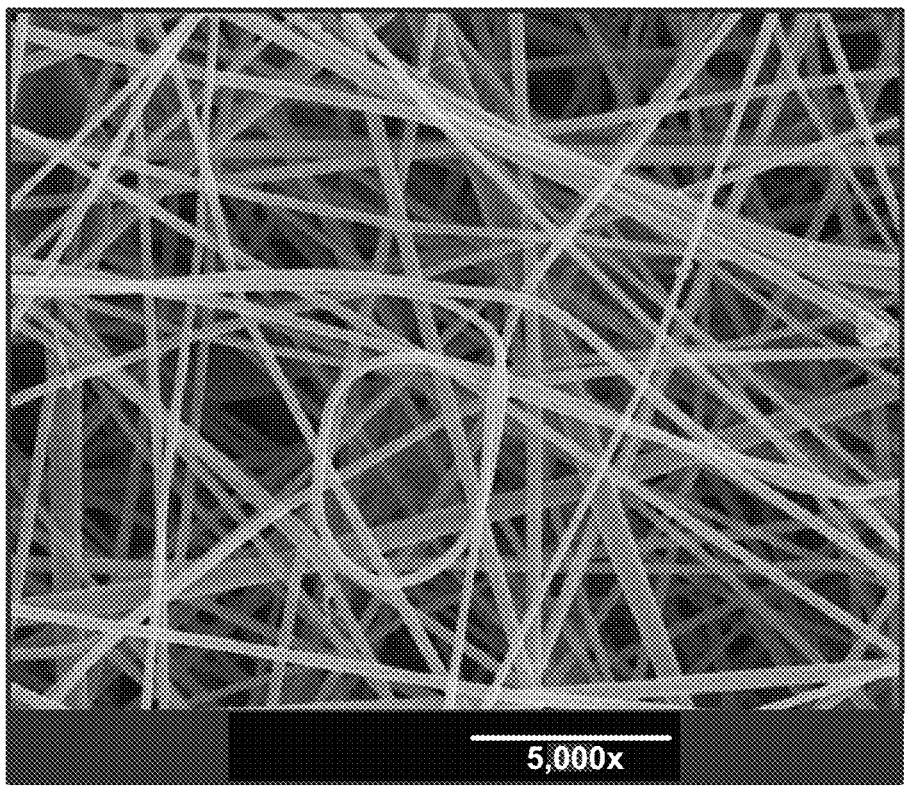
FIG. 21 is a SEM micrograph showing surface view of PBI electrospun coating at 5,000× magnification.
Figure 22:
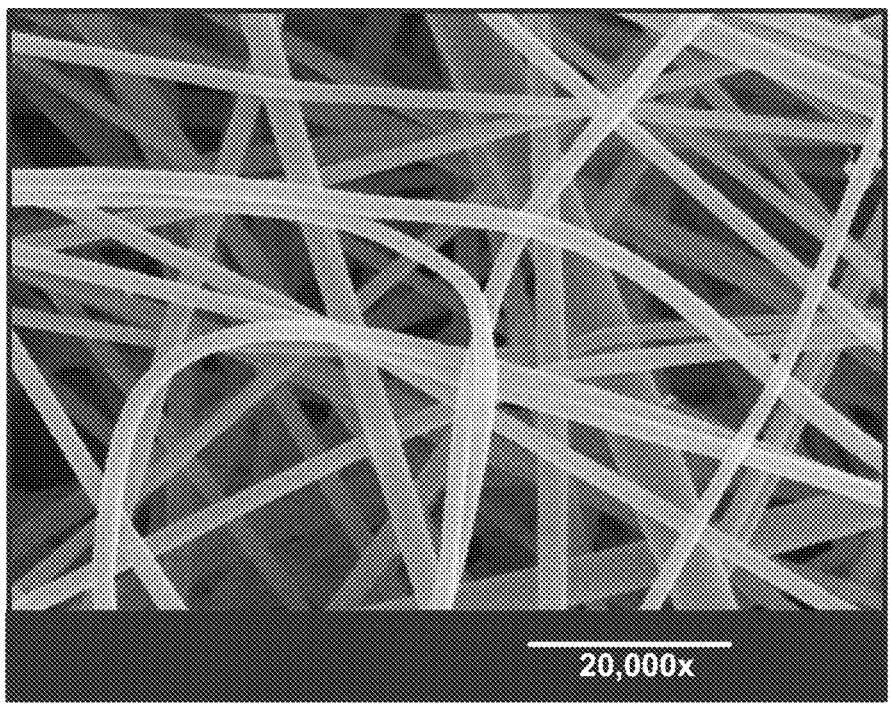
FIG. 22 is a SEM micrograph showing surface view of PBI electrospun coating at 20,000× magnification.
Figure 23:
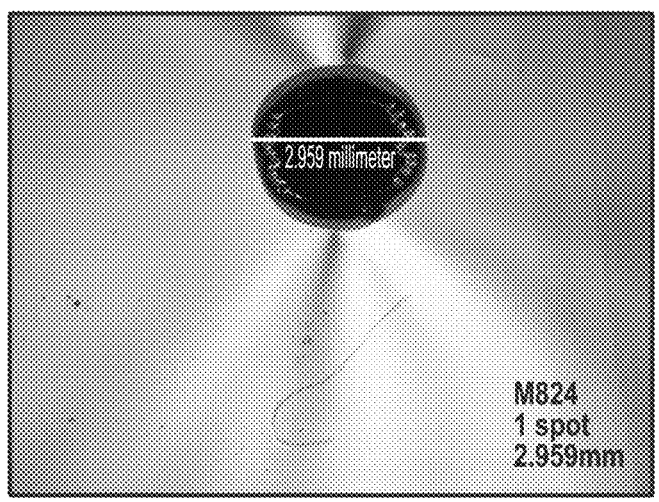
FIG. 23 is a Hot Tip Hole Propagation Control sample image with hole diameter=2.96 mm
Figure 24:
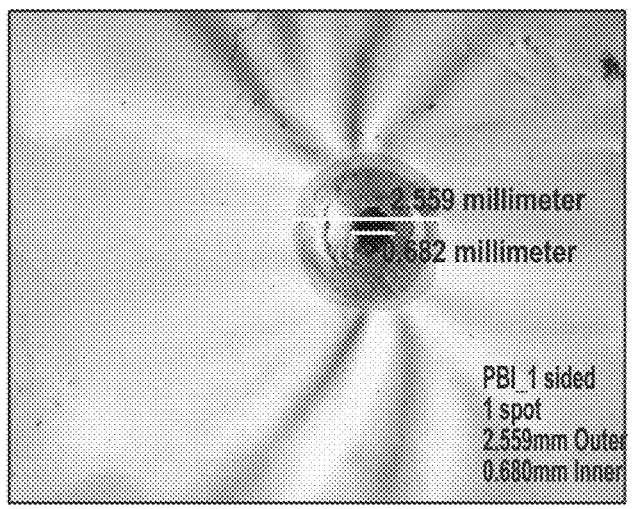
FIG. 24 is a Hot Tip Hole Propagation 1-sided PBI coated sample image with hole diameter=0.68 mm.
Figure 25:
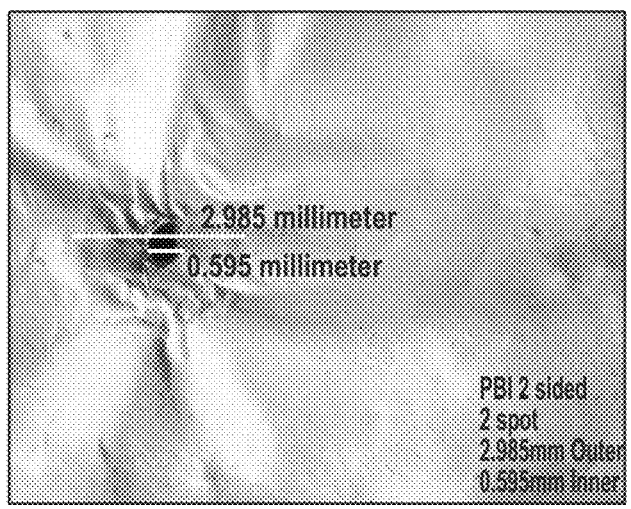
FIG. 25 is a Hot Tip Hole Propagation 2-side PBI coated sample image with hole diameter=0.595 mm.

In accordance with selected embodiments, at least one object of the present invention is to provide a high melt temperature electrospun coated microporous Lithium-ion rechargeable battery separator or membrane that is capable of retaining its physical structure up to 250 deg C. in a Lithium-ion rechargeable battery (cell, pack, battery, accumulator, capacitor, or the like) for at least a short period of time. This particular possibly preferred separator or membrane preferably has an electrospun nanofiber coating of polybenzimidazole (PBI) or a blend of PBI with another polymer or polymers applied to at least one side thereof and preferably coated on two sides of a microporous base membrane. The electrospun nanofiber coating preferably consists of nanoscale PBI fibers which are in the range of 10 to 2,000 nanometers in diameter, preferably 20 to 1,000 nanometers in diameter, more preferably 25 to 800 nanometers in diameter, and most preferably 30 to 600 nanometers in diameter as shown in the Scanning Electron Microscopy (SEM) micrographs in FIGS. 21 and 22. The targeted basis weight of the nanoscale PBI electrospun coating of the high melt temperature microporous Lithium-ion rechargeable battery separator membrane is 1.0 to 8.0 $g/m^2$ or more, preferably 2.0 to 6.0 $g/m^2$, more preferably 2.2 to 5.0 $g/m^2$, and most preferably 2.5 to 5.0 $g/m^2$.

The results of Hot Electrical (Hot ER) Resistance testing, the Extension-Thermogravimetric Analysis (e-TMA) testing and Hot Tip Hole Propagation testing were used to define the high melt temperature integrity (HTMI) performance of the inventive electrospun coated microporous Lithium-ion rechargeable battery separator membrane.

Figure 2:
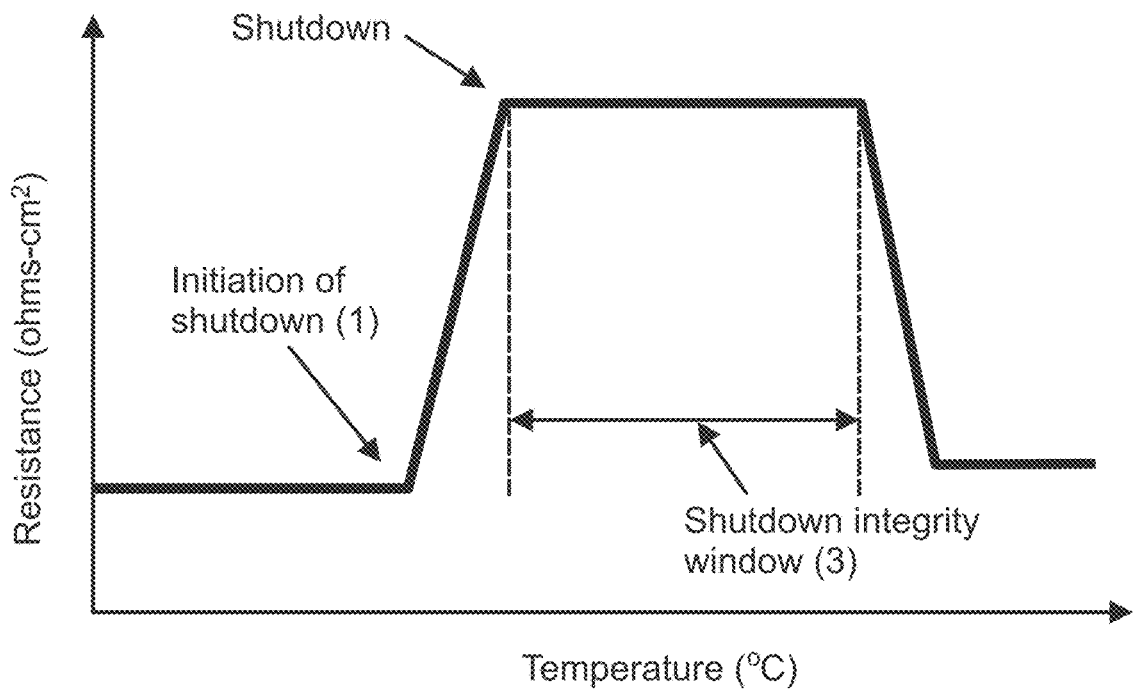
FIG. 2 is schematic of typical Hot ER (Electrical Resistance) thermogram.
Figure 3:
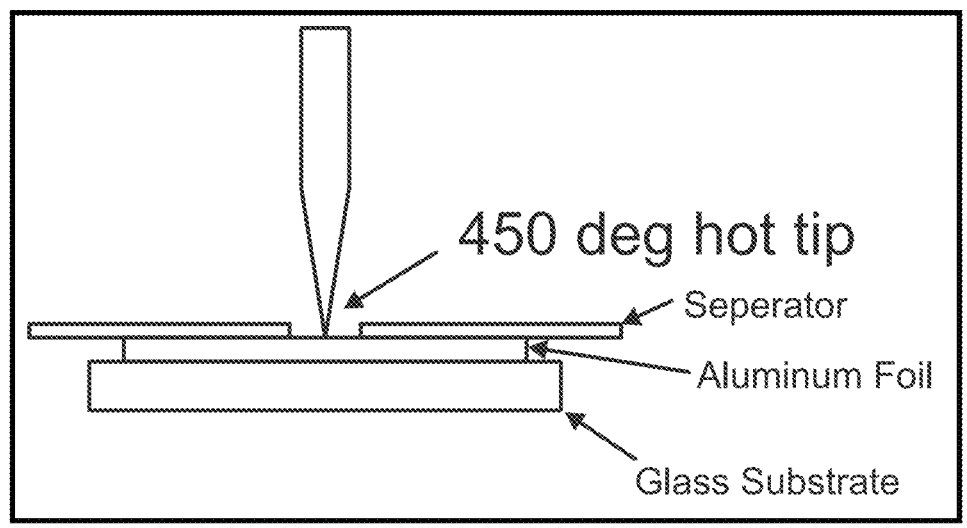
FIG. 3 is schematic side view of Hot Tip Hole propagation test setup.
Figure 4:
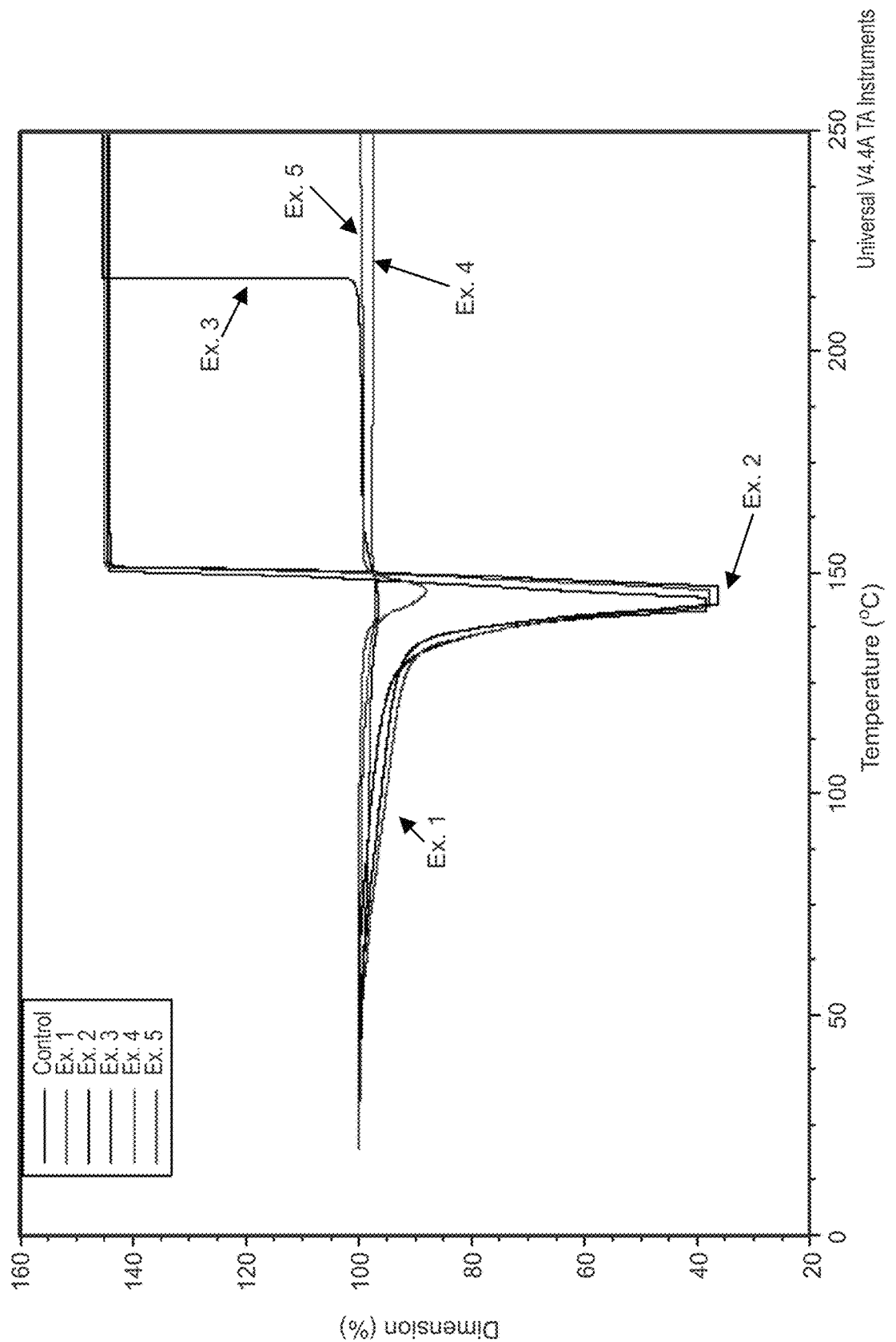
FIG. 4 is an Expansion Thermomechanical Analysis (e-TMA) thermogram of the 13 μm Control (uncoated) base membrane and the five coated embodiments included as present Examples 1-5.
Figure 5:
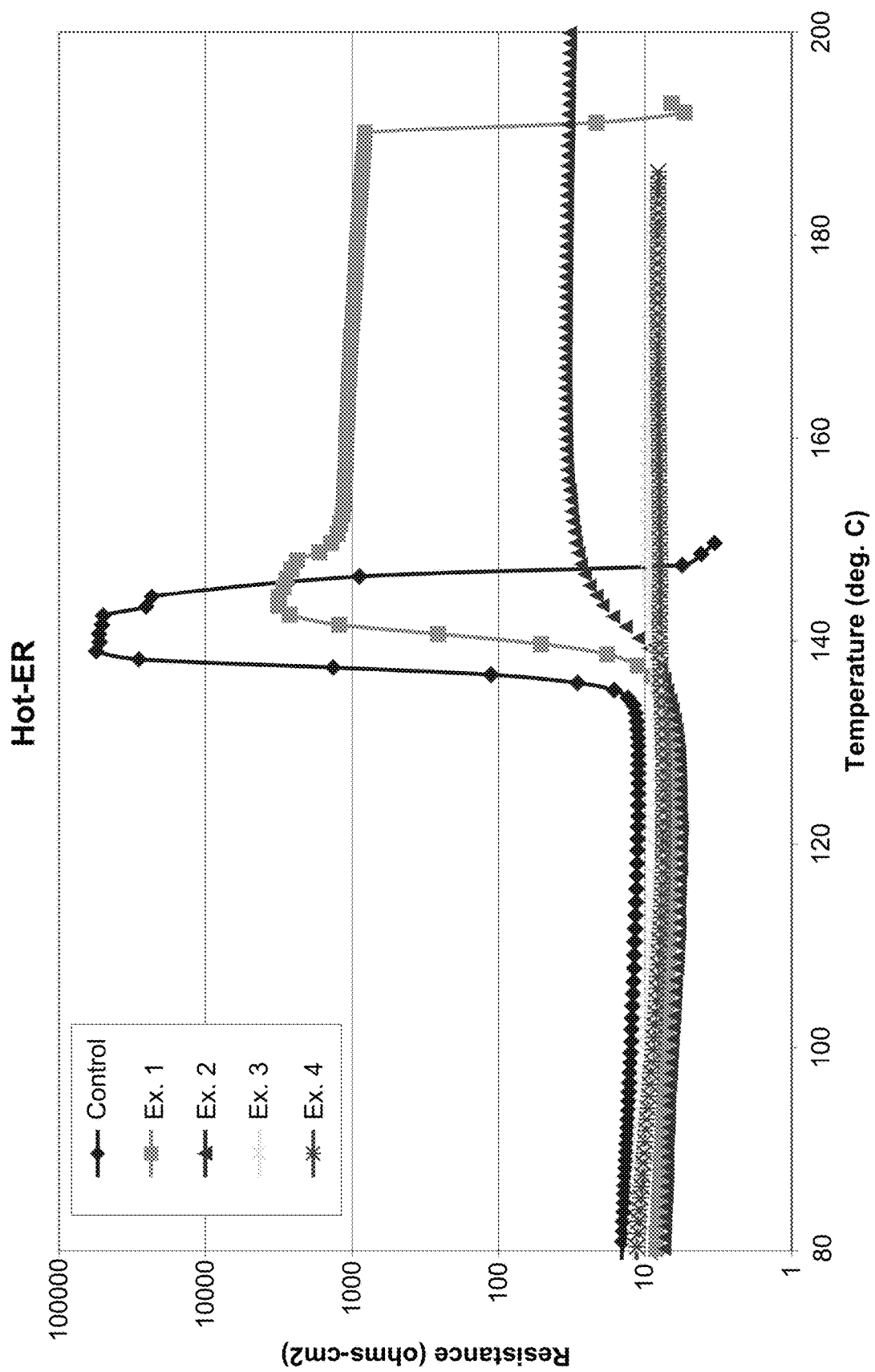
FIG. 5 is a Hot Electrical Resistance (Hot ER) thermogram of the 13 μm Control and present Examples 1-4.
Figure 6:
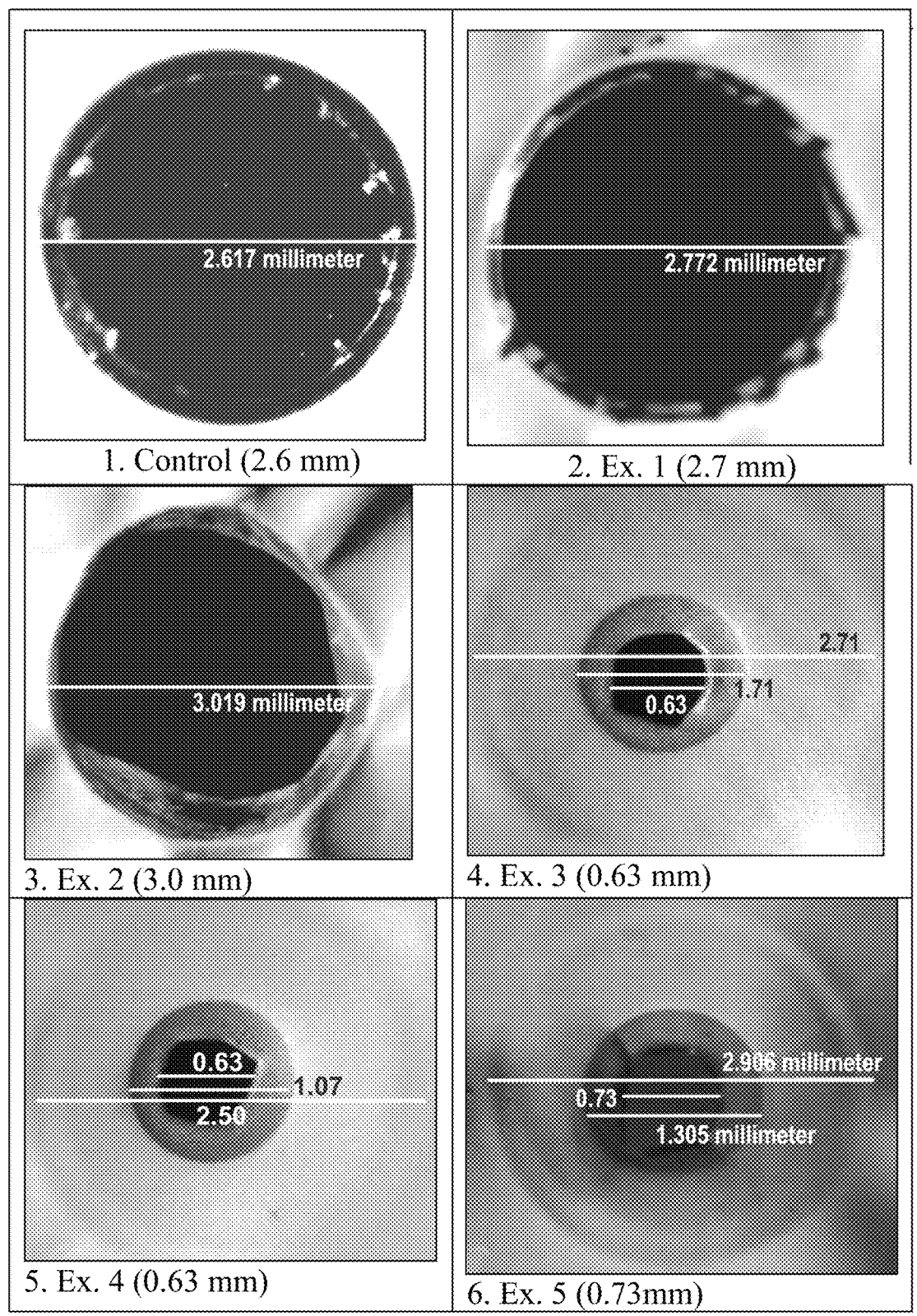
FIG. 6 shows six respective top view digital images of Hot Tip Hole propagation test results conducted on the 13 μm Control (uncoated) base membrane and the five coated embodiments included as present Examples 1-5 with hole diameters indicated.
Figure 7:
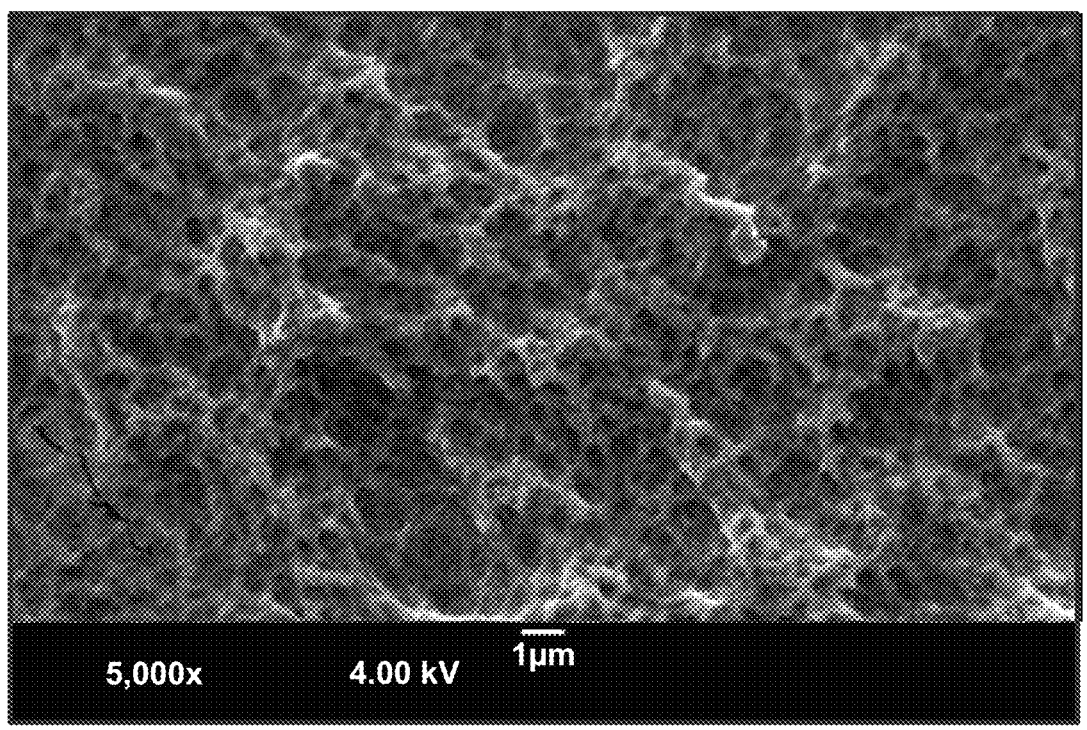
FIG. 7 is a surface SEM micrograph view at 5,000× magnification of present Example 4.
Figure 8:
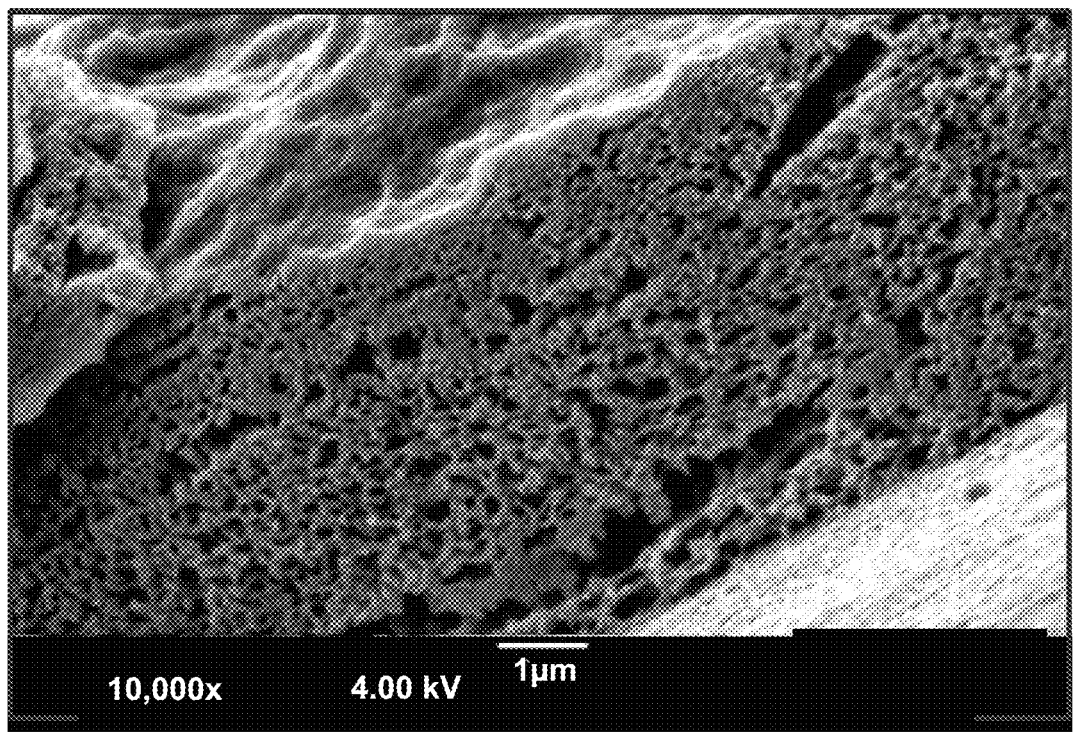
FIG. 8 is a cross section SEM micrograph at 10,000× magnification of present Example 4.
Figure 9:
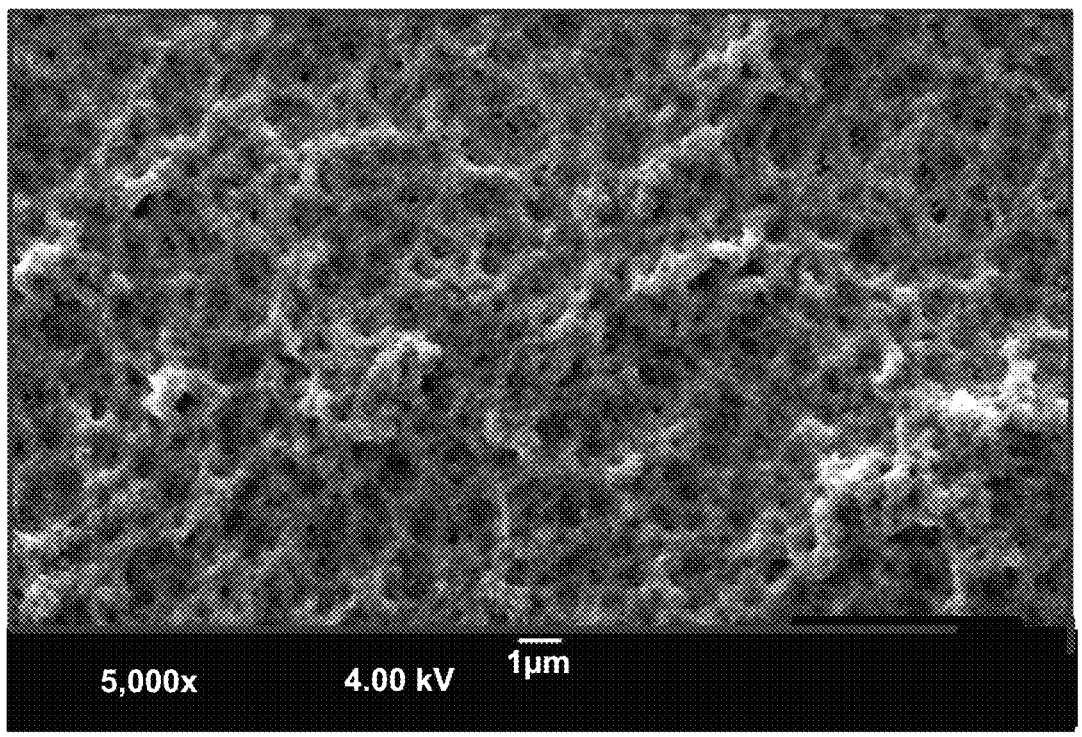
FIG. 9 is a surface SEM micrograph at 5,000× magnification of present Example 3.
Figure 10:
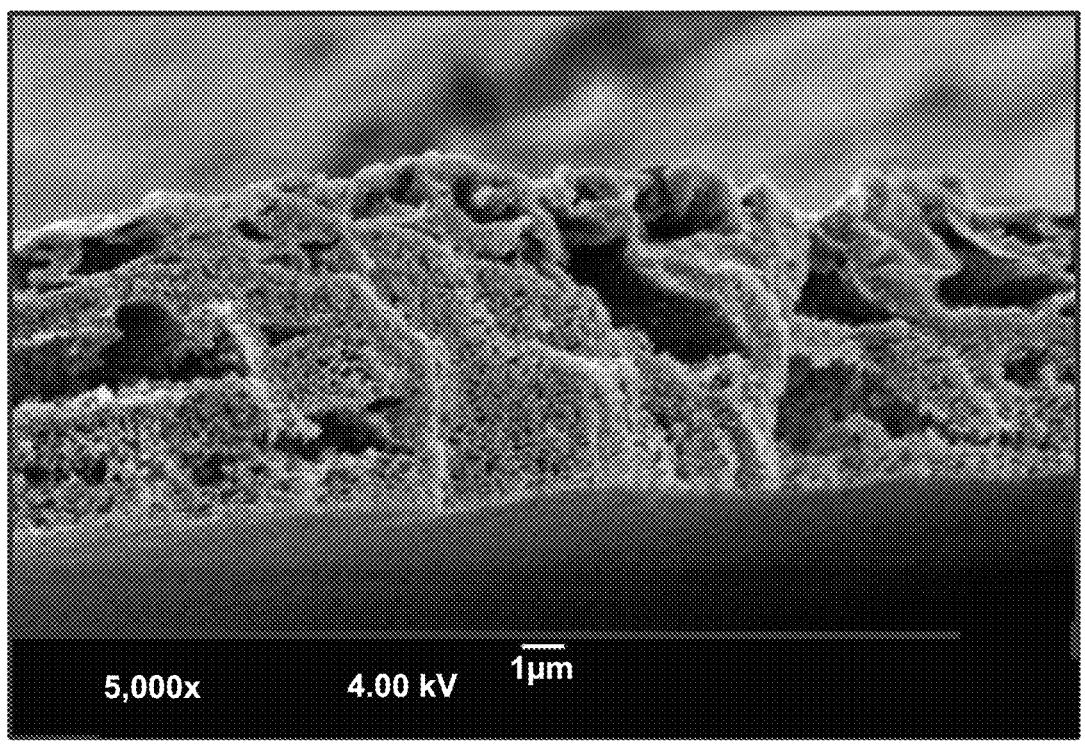
FIG. 10 is a cross section SEM micrograph at 5,000× magnification of present Example 3.
Figure 11:
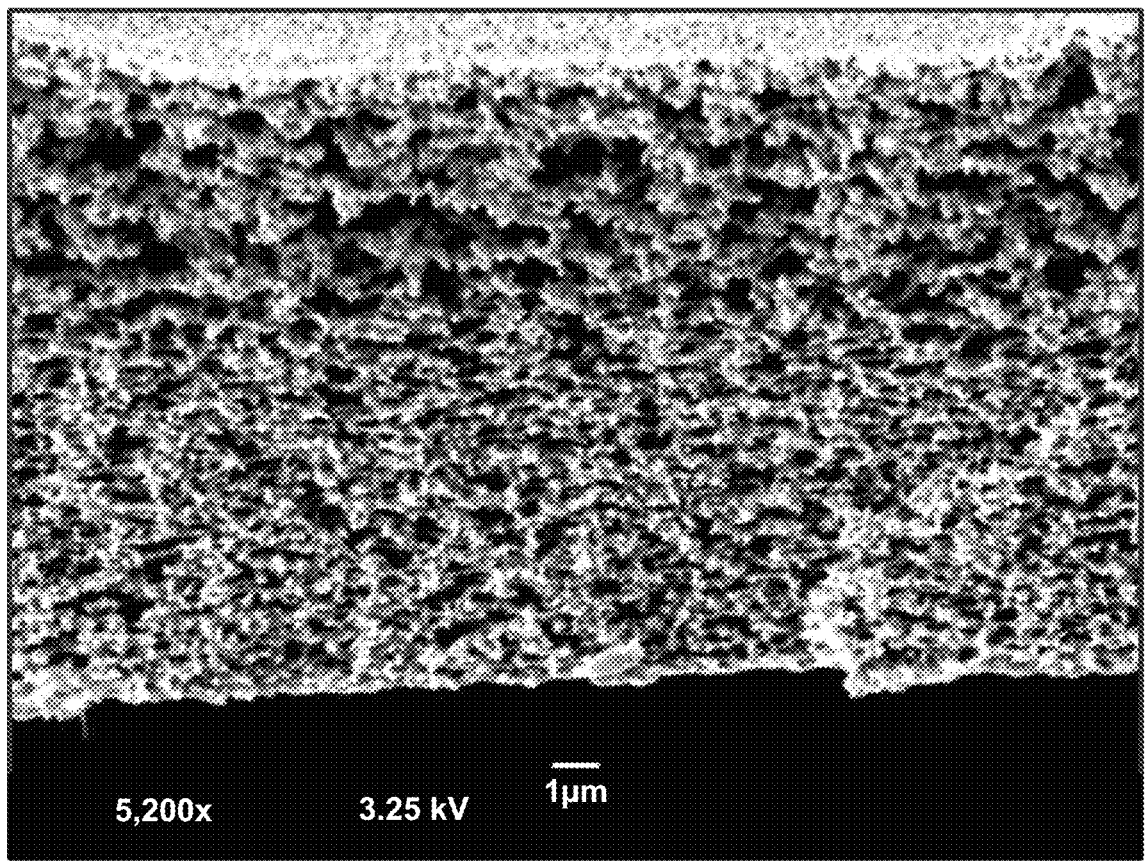
FIG. 11 is a cross section SEM micrograph at 5,200× magnification of the coating in present Example 5.
Figure 12:
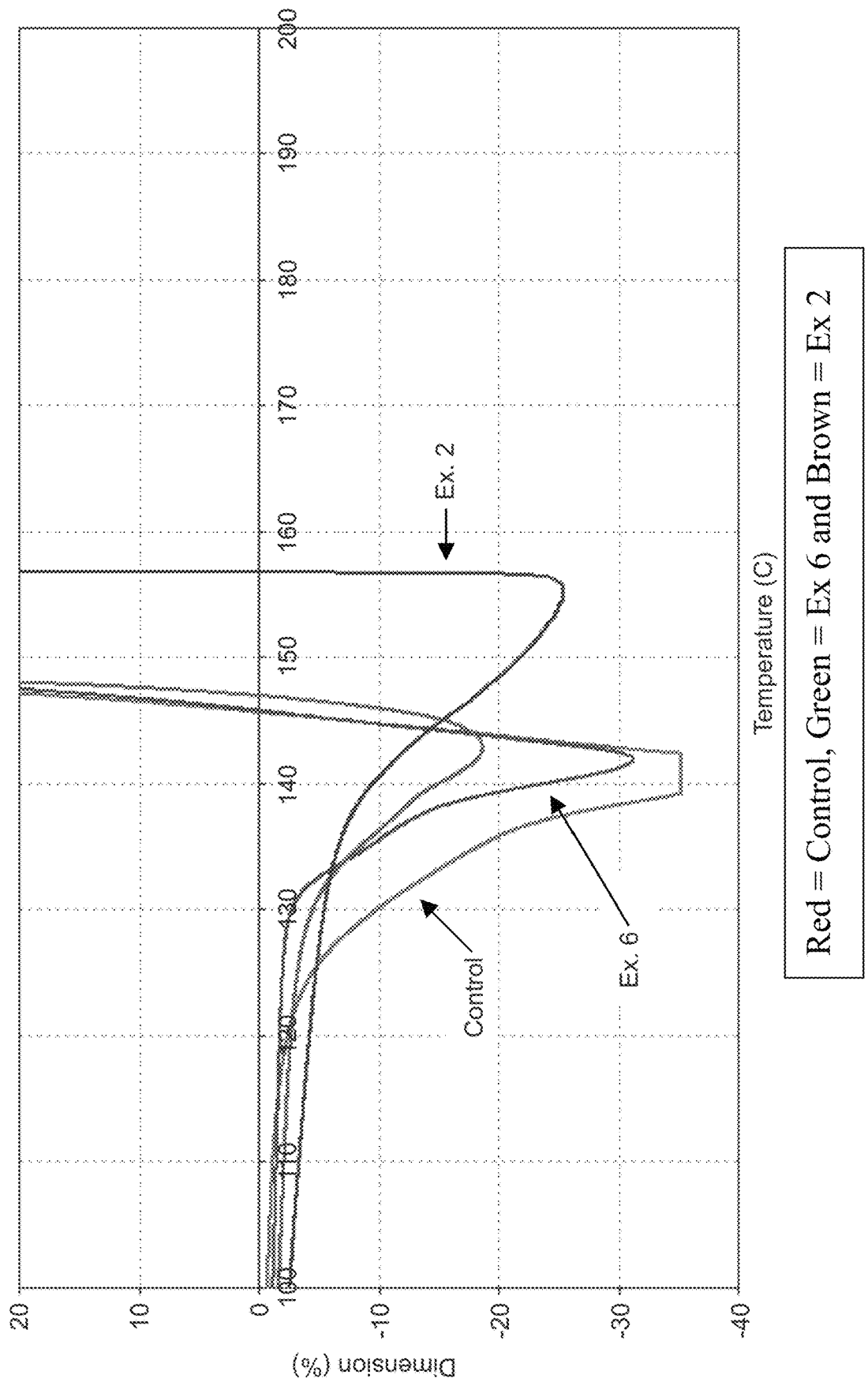
FIG. 12 is an Expansion Thermomechanical Analysis (e-TMA) thermogram of the 16 μm Control Sample and present Examples 6 and 2.
Figure 13:
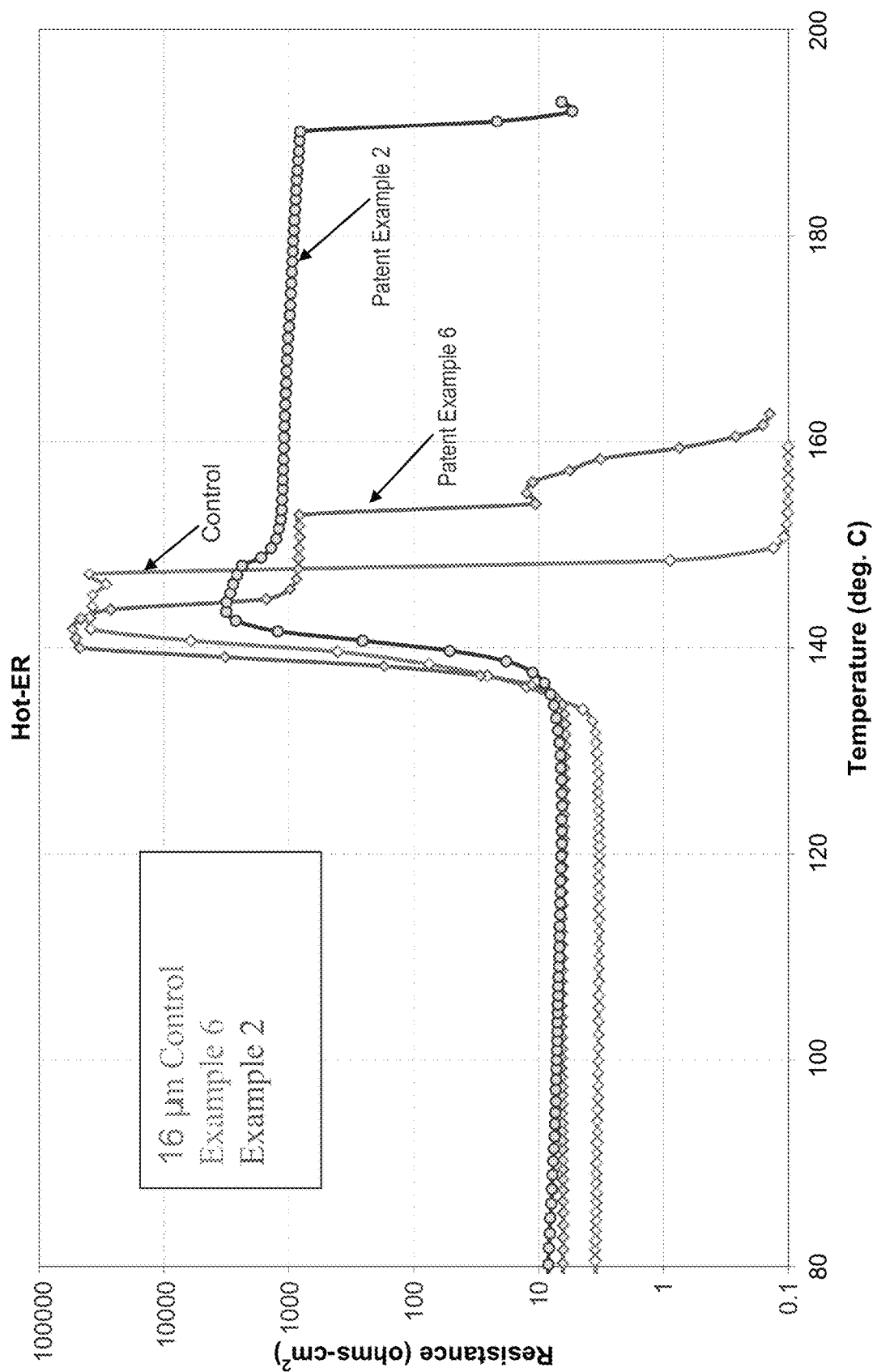
FIG. 13 is a thermogram of a Hot Electrical Resistance (Hot ER) test on the 16 μm Control Sample and present Examples 6 and 2.
Figure 15:
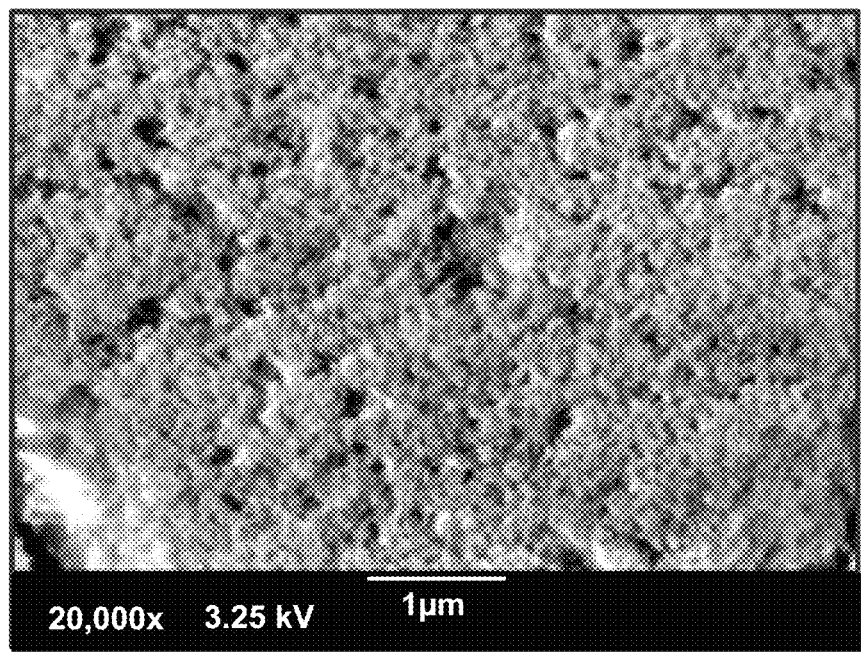
FIG. 15 is a surface SEM micrograph at 20,000× magnification of present Example 6.
Figure 16:
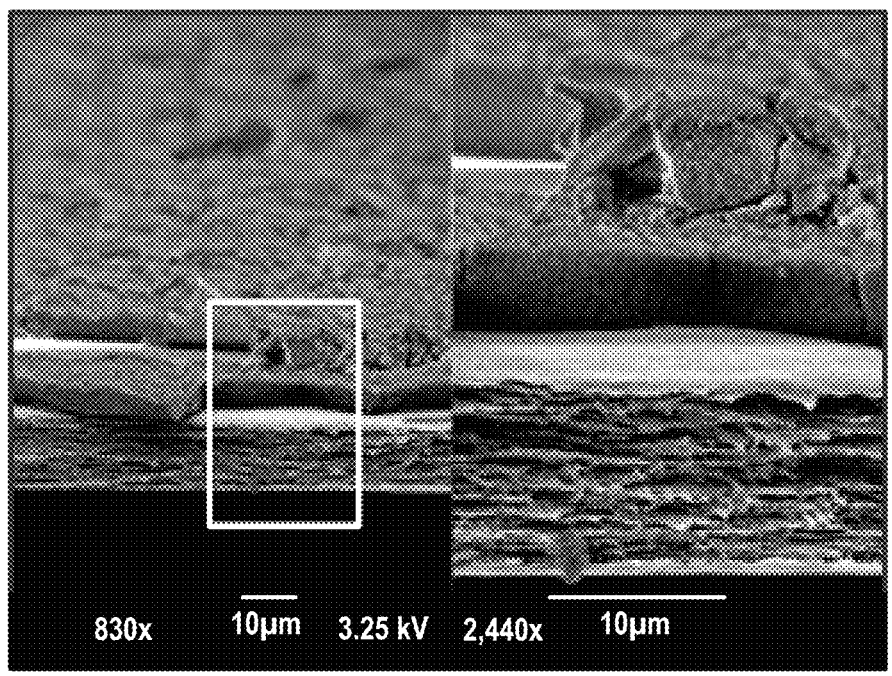
FIG. 16 are respective cross section SEM micrographs (left image) at 830× magnification and (right image) at 2,440× magnification of present Example 6.
Figure 17:
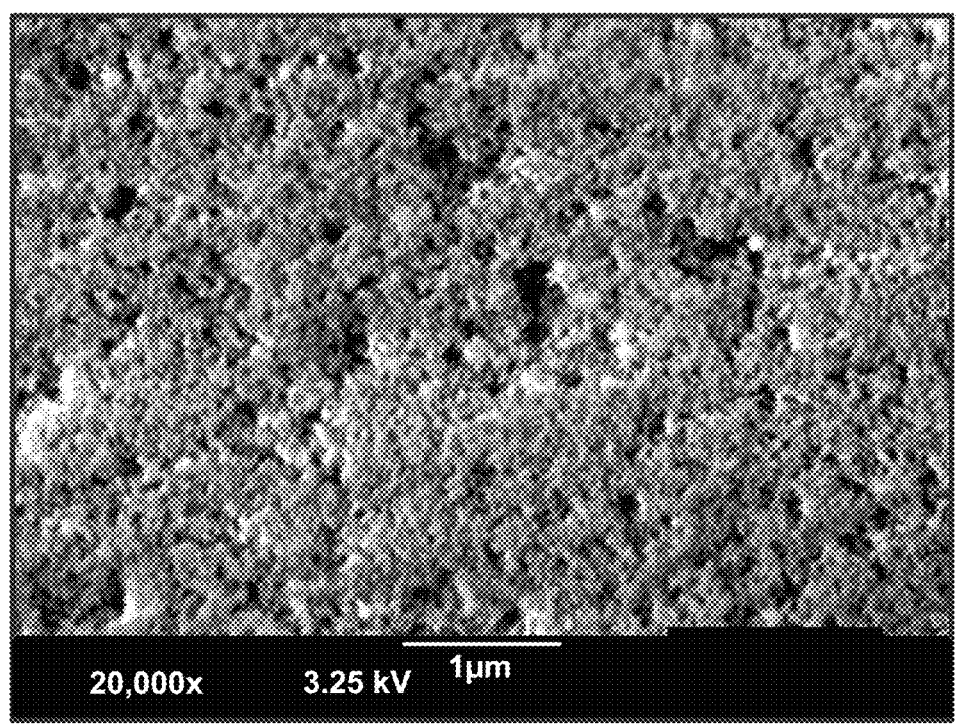
FIG. 17 is a surface SEM micrograph at 20,000× magnification of present Example 2.
Figure 18:
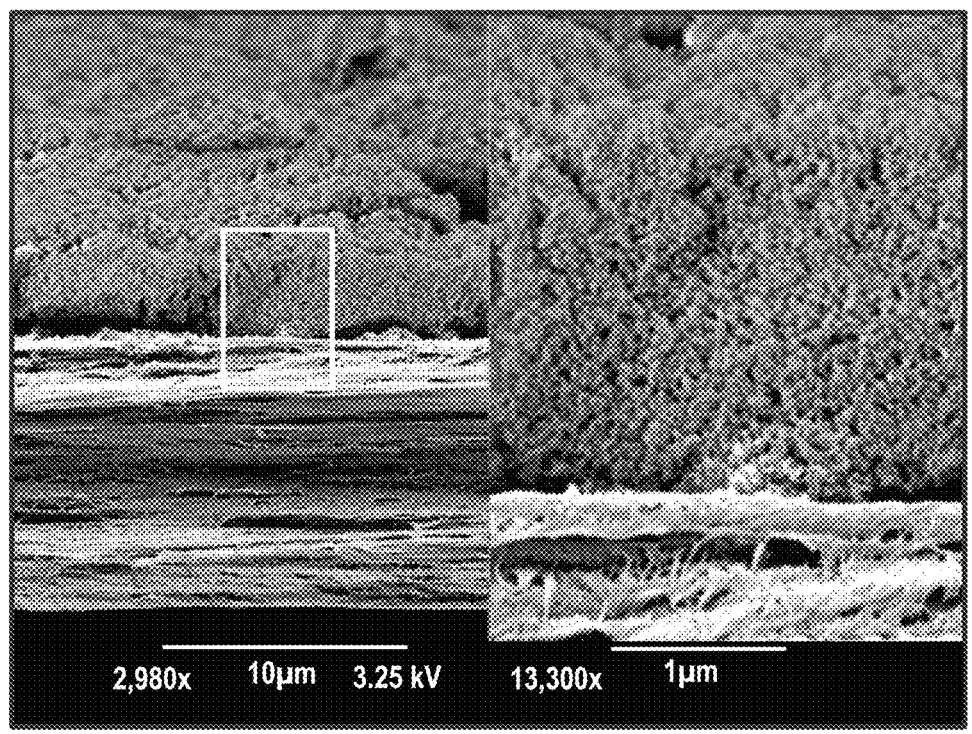
FIG. 18 are respective cross section SEM micrographs at a magnification of 2,980× (left image) and at a magnification of 13,300× (right image) of present Example 2.
Figure 19:
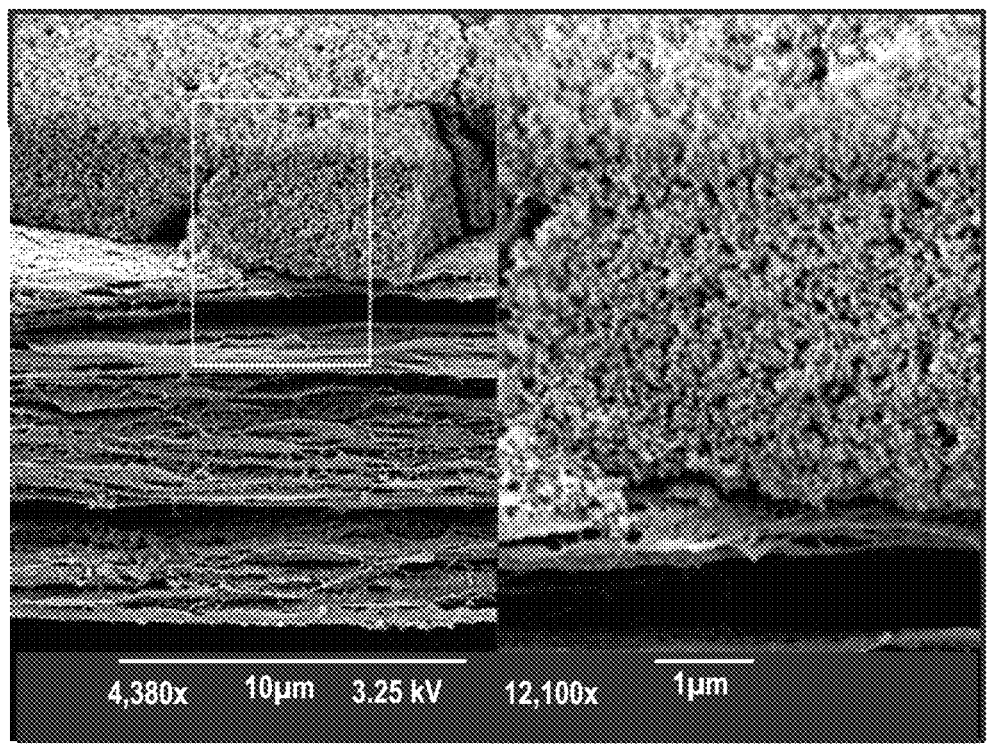
FIG. 19 are additional respective cross section SEM micrographs at a magnification of 4,380 (left image) and at a magnification of 12,100× (right image) of present Example 2.
Figure 26:
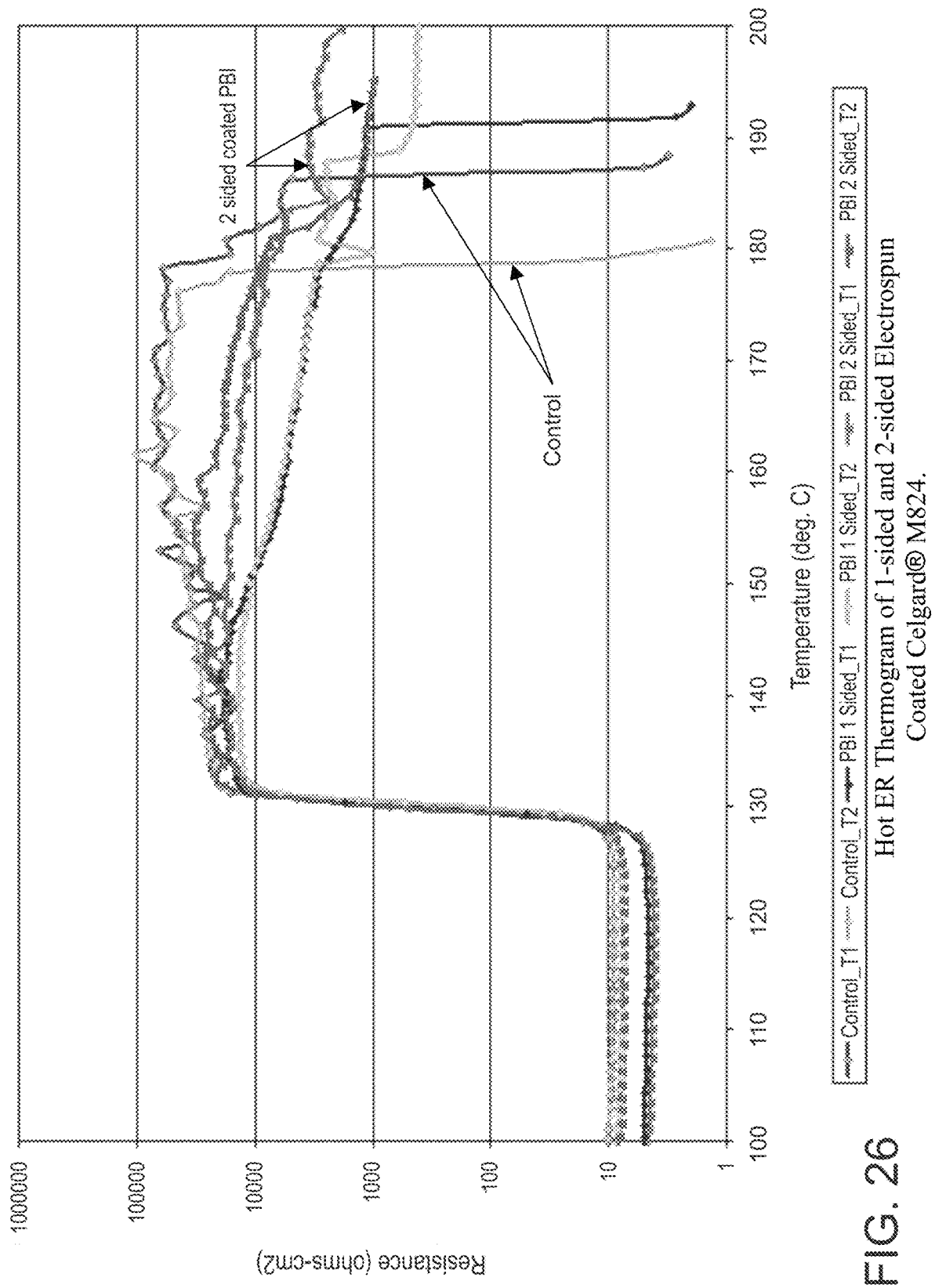
FIG. 26 is a Hot ER Thermogram of Uncoated control sample, 1-sided PBI coated and 2-sided PBI coated Celgard membrane.

FIG. 2 shows a typical Hot ER thermogram showing initial shutdown of a test sample indicated by a sudden increase in Resistance and shows the shutdown integrity window as a flat section of the thermogram where Resistance is sustained at a high level. FIG. 26 shows Hot ER test results of the inventive PBI one side coated separator and test results of a two sided PBI coated separator membrane. At a temperature of approximately 135 deg C., the pores in the PE layer of the Celgard® M824 PP/PE/PP multilayer base membrane melt and close and the base membrane undergoes thermal shutdown. The Hot ER test indicates thermal shutdown has occurred in the base membrane with a sharp increase in electrical resistance. As the temperature is increased in the Hot ER test, the one and two side PBI coated M824 membranes have a sustained increased electrical resistance up to a temperature of 200 deg C. indicating the high melt temperature integrity of the inventive separator membrane. The high level of sustained increased electrical resistance is indicative that the separator membrane may prevent electrode shorting in a battery beyond 200 deg C.

Figure 27:
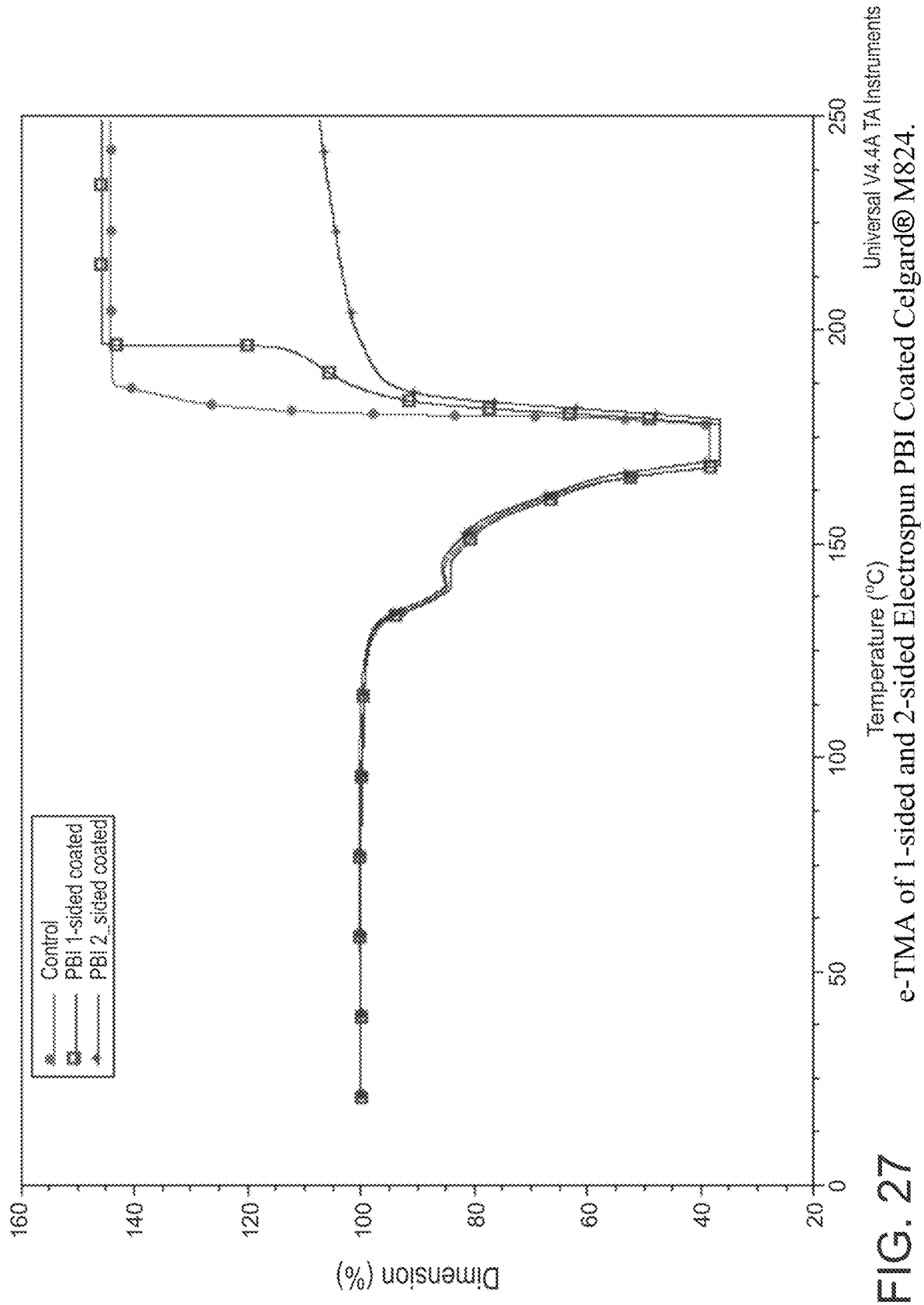
FIG. 27 is an Extension-TMA Thermogram of Uncoated control sample, 1-sided PBI coated and 2-sided PBI coated Celgard membrane.
Figure 28:
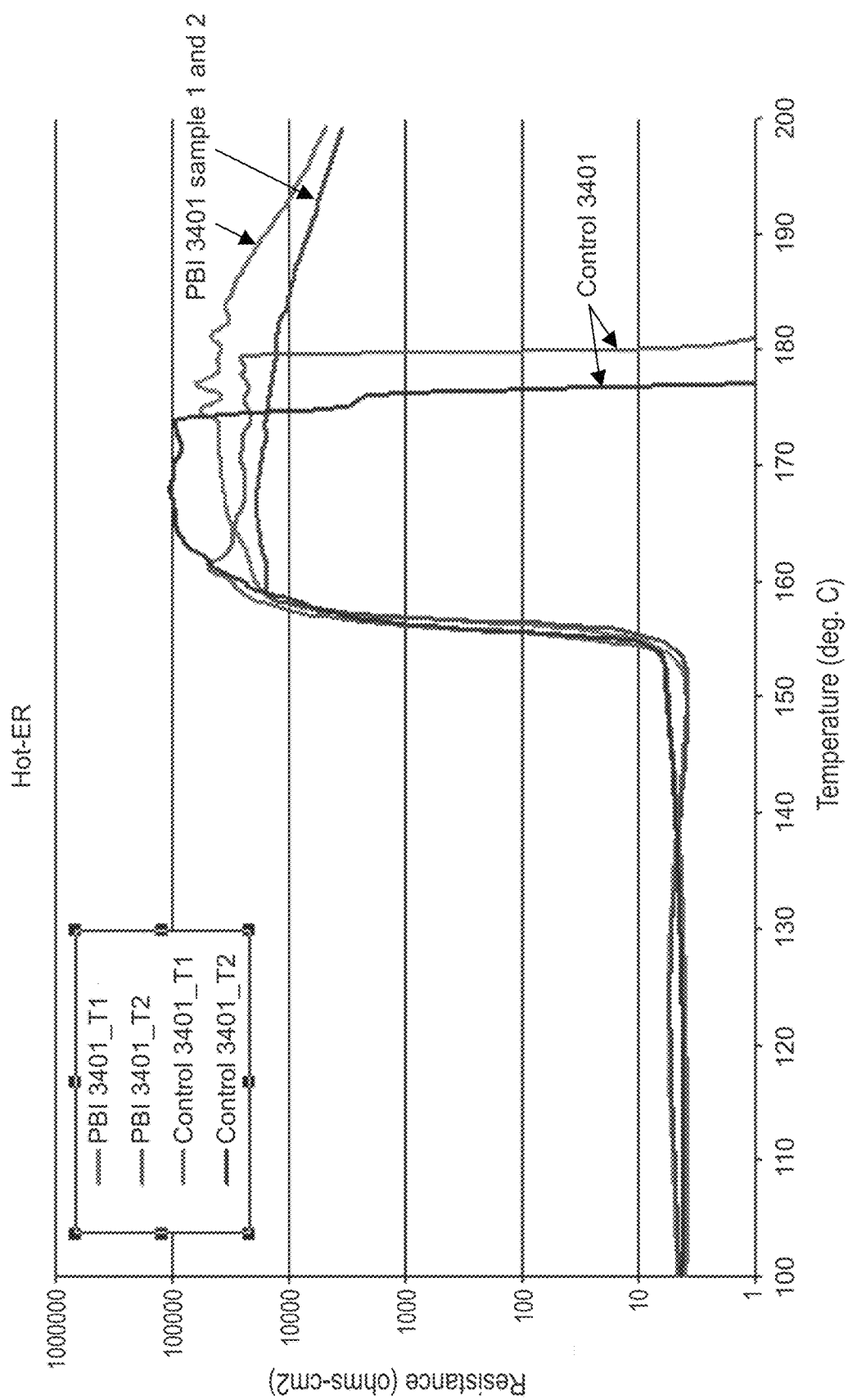
FIG. 28 is a Hot ER Thermogram of Surfactant coated Celgard®3401 control sample and 2-sided PBI coated Celgard®3401 membrane.
Figure 29:
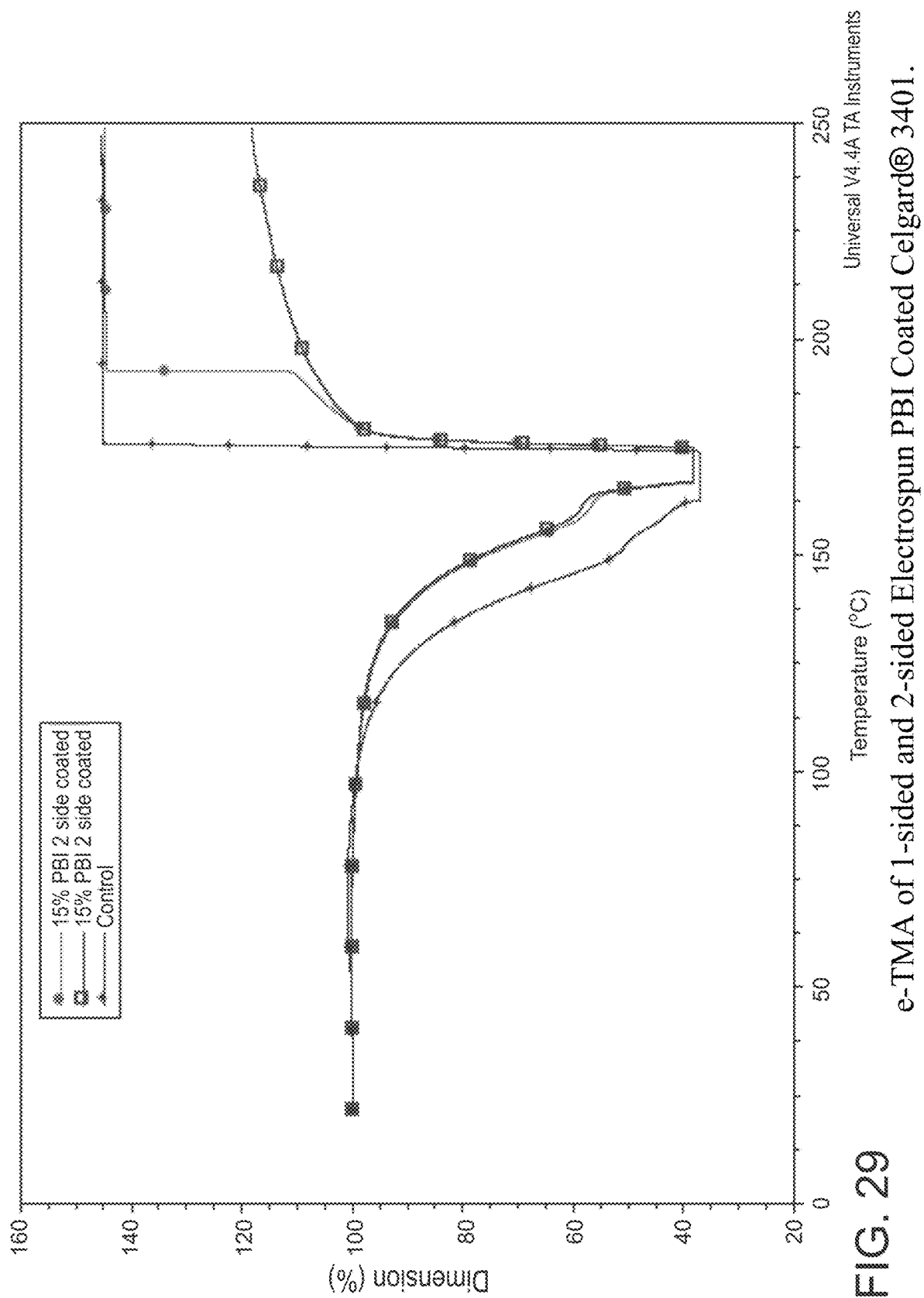
FIG. 29 is an Extension-TMA Thermogram of Surfactant coated Celgard® 3401 control sample and 2-sided PBI coated Celgard® 3401 membrane.
Figure 30:
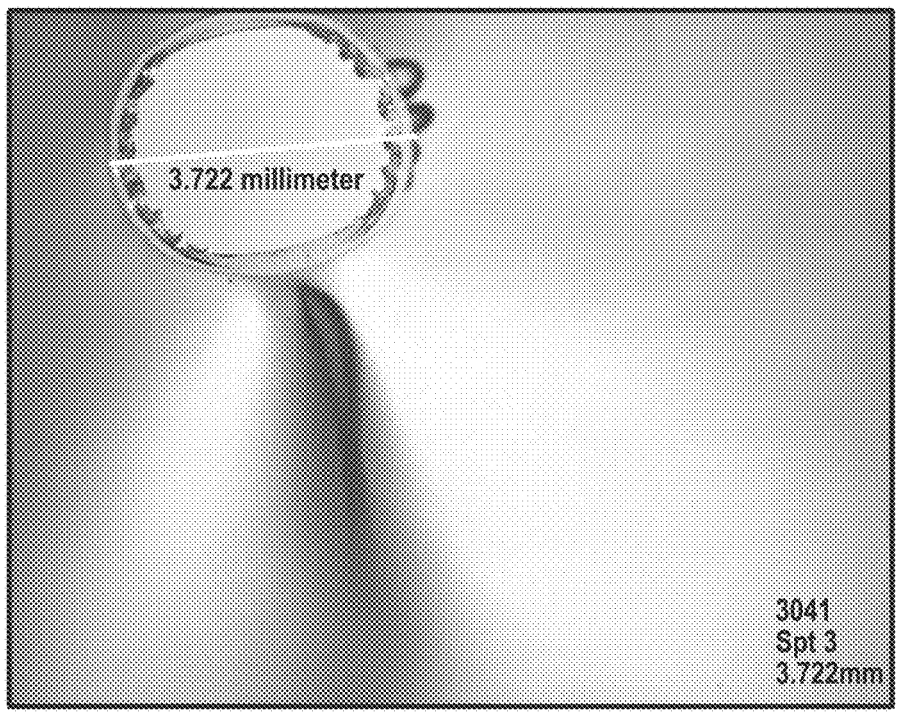
FIG. 30 is a Hot Tip Hole Propagation Celgard® 3401 surfactant coated sample image with hole diameter=3.7 mm.
Figure 31:
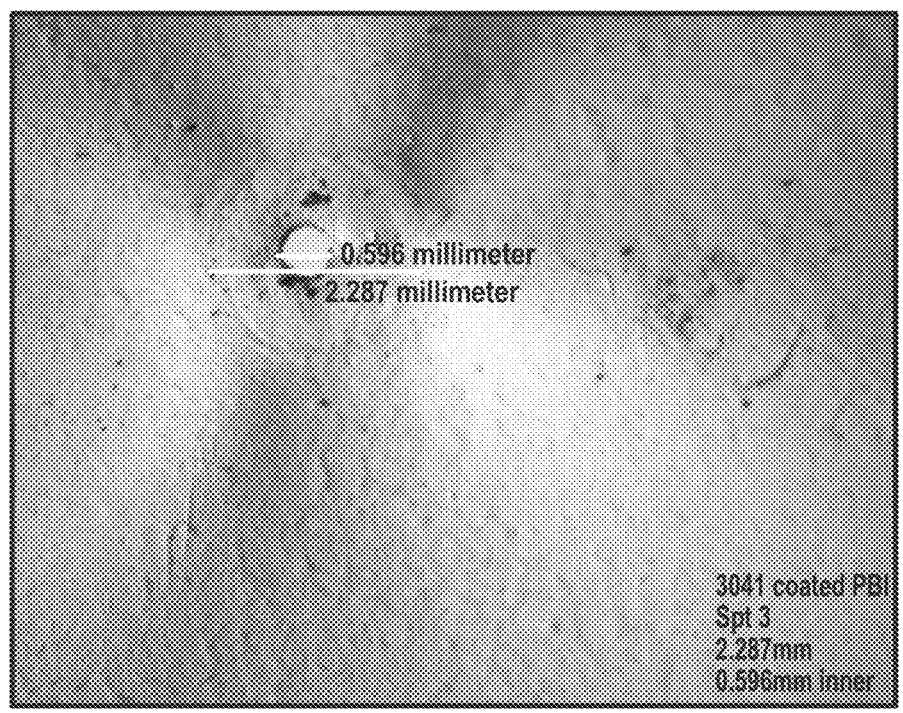
FIG. 31 is a Hot Tip Hole Propagation PBI electropsun coated sample image with hole diameter=0.596 mm.

FIG. 27 shows the Extension-Thermogravimetric Analysis (e-TMA) test results on the inventive electrospun coated separator membrane where the base membrane ruptures approximately in the region of 160-170 deg C. due to the melting of the PP layer in the multilater PP/PE/PP base membrane Celgard®M824 and as the temperature is increased, the dimension of the membrane sample remains at 100% up to 250 deg C. The dimension of the test sample remaining at 100% indicates that the PBI layer is thermally stable up to 250 deg C. This e-TMA performance indicates that the inventive separator has high temperature melt integrity (HTMI) up to a temperature of 250 deg C.

The test results of the Hot Tip Hole Propagation testing show that the diameter of the hole size of the electrospun coated one side PBI and two side PBI coated samples after contact with a hot tip probe at a temperature of 450 deg C., are 0.6 to 0.7 mm in size while the diameter of the hole size of the uncoated control sample is 2.96 mm. The Hot Tip Hole Propagation results indicate that the PBI electrospun coated separator membrane has high temperature stability in the X, Y and Z directions. Minimal hole propagation in response to contact with the hot tip probe simulates the desired response of the separator membrane to a localized hot spot which may occur during an internal short circuit in Li-ion cells.

The electrospinning process can deposit nanoscale PBI fibers on the surface of a base microporous membrane, film, or composite in a random fashion building a three dimensional nanoscale fibrous web structure on the base microporous membrane. The fibers have a smooth surface appearance when viewed by SEM at 5,000× magnification and are non-porous, that is, the fibers do not have any pores or holes.

The electrospinning coating approach can coat a high Tg polymer such as PBI or a blend of PBI and another polymer or polymers such as polyaramids, polyimides and polyamideimide and blends, mixtures and/or combinations thereof onto a microporous porous membrane without an detrimental affect to the pore structure or the porosity of the porous base membrane, that is, the nanoscale electrospun fibers do not block the pores of the base membrane. The electrospinning process provides a method of applying a high Tg polymer in the form of nanoscale fibers onto a microporous base membrane without the nanoscale fibers themselves being porous. The spaces between the fibers provide the desired porosity. Therefore an additional process step to form pores in the electrospun nanoscale high Tg polymer fibers is not required. In the electrospinning process the high Tg polymers or polymers are dissolved in a solvent or solvents. The solvent is evaporated during the formation of the electrospun fibers. Typically, dip coated or gravure coated methods of applying polymers onto a microporous base membrane may require the coated film to be immersed in a bath designed for removing or extracting the polymer solvent. This immersion step forms a porous structure in the coating. The present electrospinning method of applying high Tg polymers onto microporous membranes can be simpler from a manufacturing point of view due to the fact that an extraction or immersion step to remove the solvent and form pores in the coating is not required. Electrospinning can be a less costly manufacturing process for the application of nanoscale high Tg polymer fibers onto a microporous membrane, film, composite, or carrier to produce a high melt temperature microporous Lithium-ion rechargeable battery separator, membrane, composite, or the like.

EXAMPLE 1

A 13 um Celgard® EK1321 PE microporous membrane was coated with a 4 µm coating layer consisting of Polybenzimidazole (available as a 26% dope in DMAc from PBI Performance Products in Rock Hill, S.C.) and Degussa fumed Alumina 20 nm diameter particles. The coating solution is prepared by first drying the Alumina particles in a 180 deg C. oven overnight to remove moisture. A 25% by weight slurry of the dried Alumina particles in DMAc is then prepared. The final coating composition is 7% polybenzimidazole (PBI), 28% Alumina and 65% DMAc. The coating is applied with a slot die as a single sided coating and the coated membrane dried in an oven at 80-100 deg C. for a time period of less than 15 minutes.

EXAMPLE 2

A 13 um Celgard® EK1321 PE microporous membrane was coated with a 7 µm coating layer consisting of Polybenzimidazole (available through PBI Performance Products in Rock Hill, S.C.) and Degussa fumed Alumina 20 nm diameter particles. The coating solution is prepared by first drying the Alumina particles a 180 deg C. oven overnight to remove moisture. A 25% by weight slurry of the dried Alumina particles in DMAc is then prepared. The final coating composition is 7% polybenzimidazole (PBI), 28% Alumina and 65% DMAc. The coating is applied with a slot die as a single sided coating and the coated membrane dried in an oven at 80-100 deg C. for a time period of less than 15 minutes.

EXAMPLE 3

A 13.3% PBI dope was diluted to 7% with DMAc. This coating solution was applied to the 13 um Celgard® EK1321 PE microporous membrane using a reverse gravure coating method followed by immersion of the coated membrane into a room temperature water bath. The membrane was dried in an oven at 80-100 deg C. for 6-10 minutes. The water bath was designed as a circulating bath in order to minimize the concentration of the DMAc. The membrane coating path was designed so that the coated side of the membrane did not come into contact with a roller while in the bath. Immersion time in the bath was at least 1 minute.

EXAMPLE 4

A 13.3% PBI dope was diluted to 7% with DMAc. This coating solution was applied to the 13 um Celgard® EK1321 PE microporous membrane using a reverse gravure coating method followed by immersion of the coated membrane into a 33% Propylene glycol in water bath at room temperature. The membrane was dried in an oven at 80-100 deg C. for 6-10 minutes. The membrane coating path was designed so that the coated side of the membrane did not come into contact with a roller while in the bath. Immersion time in the bath was at least 1 minute.

EXAMPLE 5

A 26% PBI dope was diluted to 10% in DMAc. This coating solution was applied to the 13 um Celgard® EK1321 PE microporous membrane using a doctor blade followed by immersion of the coated membrane into a room temperature acetone bath for 3-5 minutes. The membrane was dried in an oven at 100 deg C. for 5 minutes.

EXAMPLE 6

A 16 um Polyethlyene Celgard® separator membrane was coated with a slurry consisting of a polyaramide dissolved in DMAc mixed with Degussa fumed Alumina 20 nm particles. The coating was applied using a gravure coating method.

TABLE 1

Separator Membrane Properties of 13 μm Control Sample and present Examples 1-5.

|  | Control | Ex. 1 | Ex. 2 | Ex. 3 | Ex. 4 | Ex. 5 |
|---|---|---|---|---|---|---|
| Base Film Thickness (um) |  | 13 | 13 | 13 | 13 | 13 |
| Base Film type | PE | PE | PE | PE | PE | PE |
| Coating Thickness (um) |  | 4 | 7 | 6 | 6 | 7 |
| Total Thickness (um) | 13 | 17 | 20 | 19 | 20 | 20 |
| JIS Gurley (s) | 212 | 237 | 261 | 437 | 1106 |  |
| Puncture Strength (g) | 329 | 502 | 502 | 542 | 563 |  |
| Tensile Strength in MD (kgf/cm2) | 1824 | 1251 | 1262 | 1449 | 1568 |  |
| Tensile Strength in TD (kgf/cm2) | 996 | 951 | 809 | 948 | 909 |  |
| ER (ohms-cm2) | 1.1-1.3 | 1.7 | 1.9 | 2.5 | 2.9 |  |
| MD Shrinkage at 120 C./1 hr | 8.61 | 6.22 | 5.28 | 2.97 | 2.41 |  |
| TD Shrinkage at 120 C./1 hr | 3.4 | 0 | 0.45 | 0.78 | 1.37 |  |
| MD Shrinkage at 130 C./1 hr | 20.91 | 11.87 | 9.76 | 3.54 | 3.6 |  |
| TD Shrinkage at 130 C./1 hr | 16.53 | 6.45 | 4.39 | 1.16 | 2.14 |  |
| Hot-Tip Propagation Diameter (mm) | 2.43 | 2.8 | 3.5 | 0.63 | 0.7 | <1 |
| e-TMA Rupture Temperature (° C.) | 145 | 154 | 154 | 215 | 220 | >250 |

TABLE 2

Separator Membrane Properties of 16 μm and 13 μm Control Samples and present Examples 6 and 2.

| Property | PE Control (16 um) | Example 6 | Example 2 | PE Control (13 um) |
|---|---|---|---|---|
| Thickness (um) | 16 | 24 (13 um base film) | 17 | 13 |
| Dielectric Breakdown (V) | 2057 | 2893 | 2141 | 1178 |
| Puncture Strength (g) | 516 | 581 | 502 | 329 |
| Tensile Strength - MD kgf/cm2 | 1355 | 1023 | 1262 | 1824 |
| Tensile Strength - TD kgf/cm2 | 1145 | 1056 | 809 | 996 |

EXAMPLE 7

Celgard® M824 Trilayer microporous membrane is electrospun coated on one side with a 15% solution of Polybenzimidazole (PBI) (available as 26% dope from PBI Performance products in Rock Hill, S.C.) with Dimethylacetamide (DMAc) as the solvent. Coating process used a nozzle type electrospinning device where the applied voltage is 15 kV, the flow rate is 0.5 ml/h, the gauge of the needle is 7" ID, 0.025" OD and the distance between the needle tip and the collector is 25 cm. The thickness of the coating applied to one side of the M824 base membrane is 7-8 μm. The total thickness of the coated sample is 20 μm.

EXAMPLE 8

Celgard® M824 Trilayer microporous membrane is electrospun coated on both sides with a 15% solution of Polybenzimidazole (PBI) (available as 26% dope from PBI Performance products in Rock Hill, S.C.) with Dimethylacetamide (DMAc) as the solvent. Coating process used a nozzle type electrospinning device where the applied voltage is 15 kV, the flow rate is 0.5 ml/h, the gauge of the needle is 7" ID, 0.025" OD and the distance between the needle tip and the collector is 25 cm. The basis weight of the coated sample is 0.94 mg/cm². A 3-4 μm thick coating is applied to each side of the M824 base membrane. The total thickness of the coated sample is 20 μm.

EXAMPLE 9

Celgard® 3401 surfactant coated monolayer polypropylene microporous membrane is electrospun coated on both sides with a 15% solution of Polybenzimidazole (PBI) (available as 26% dope from PBI Performance products in Rock Hill, S.C.) with Dimethylacetamide (DMAc) as the solvent. Coating process used a nozzle type electrospinning device where the applied voltage is 15 kV, the flow rate is 0.5 ml/h, the gauge of the needle is 7" ID, 0.025" OD and the distance between the needle tip and the collector is 25 cm. The total thickness of the coated sample is 55 μm.

TABLE 3

HTMI Test Data on Control Trilayer M824 Sample and 1-Sided PBI coated and 2-Sided PBI Coated Celgard Trilayer Base Membrane.

|  | M824 Control PP/PE/PP Trilayer | 1-sided PBI Coated | 2-sided PBI Coated |
| --- | --- | --- | --- |
| thickness, um | 12.0 | 19.3 | 20.2 |
| puncture strength, g | 259.8 | 267.4 | 218.2 |
| Basis Weight mg/cm2 | 0.71 | 0.91 | 0.94 |
| ER (ohm-cm2) | 1.67 | 1.99 | 2.98 |
| Hot tip, um spot 1 | 3.0 | 0.6 | 0.78 |
| spot 2 | 3.0 | 0.6 | 0.6 |
| spot 3 | 3.1 | 0.6 | 0.6 |
| Hot ER | shutdown at 135 deg C. | Base PE layer shutdown at 135 deg C., PBI sustained shutdown at 200 deg C. | Base PE layer shutdown at 135 deg C., PBI layer sustained Resistance up to 200 deg C. |
| e-TMA | PE layer ruptured at 135 deg C., PP layer ruptured at 165 deg C. | PE base layer ruptured at 135 deg C., PP base layer ruptured at 165 deg C., PBI caused shift in line at 200 deg C. | PE base layer ruptured at 135 deg C., PP base layer ruptured at 165 deg C., PBI layer did not rupture and maintained structural integrity up to 250 deg C. |

TABLE 4

HTMI Test Data on Control Trilayer Celgard® 3401 Sample and 2-Sided PBI Coated Celgard® 3401.

|  | 3401 Control Monolayer PP | 2-sided PBI Coated |
| --- | --- | --- |
| thickness, um | 26 | 55 |
| Basis Weight mg/cm2 | 1.56 | 2.22 |
| Hot tip, um spot 1 | 3.8 | 1.6 |
| spot 2 | 4.2 | 1.3 |
| spot 3 | 3.7 | 0.5 |
| Hot ER | Base PP membrane melted at 165 deg C. | Base PP membrane melted at 165 deg C., PBI layer sustained Resistance up to 200 deg C. |
| e-TMA | Base PP membrane ruptured at 165-170 deg C. | Base PP membrane ruptured at 165-170 deg C., PBI layer did not rupture up to 250 deg C. |

Test Procedures

Thickness: Thickness is measured using the Emveco Microgage 210-A precision micrometer according to ASTM D374. Thickness values are reported in units of micrometers (μm).

Gurley: Gurley is defined as the Japanese Industrial Standard (JIS Gurley) and is measured using the OHKEN permeability tester. JIS Gurley is defined as the time in seconds required for 100 cc of air to pass through one square inch of film at a constant pressure of 4.9 inches of water.

Tensile Properties Machine Direction (MD) and Transverse Direction (TD) tensile strength is measured using Instron Model 4201 according to ASTM-882 procedure.

Puncture strength: Puncture strength is measured using Instron Model 4442 based on ASTM D3763. The measurements are made across the width of microporous stretched product and the average puncture strength is defined as the force required to puncture the test sample.

Shrinkage: Shrinkage is measured at two temperatures by placing a sample in an oven at 120 deg C. for 1 hour and placing a second sample in an oven at 130 deg C. for 1 hour. Shrinkage has been measured in both Machine Direction (MD) and Transverse Direction (TD).

Basis Weight: Basis weight is determined using ASTM D3776 and the units are in mg/cm².

Hot Tip Hole Propagation test: In the Hot Tip hole propagation test a hot tip probe at a temperature of 450 deg C. with a tip diameter of 0.5 mm is touched to the surface of the separator membrane. The hot tip probe approaches the membrane at a speed of 10 mm/minute and is allowed to contact the surface of the separator membrane for period of 10 seconds. Results of the hot tip test are presented as a digital image taken with an optical microscope showing both the shape of the hole formed as a result of the response of the separator membrane to the 450 deg C. hot tip probe and the diameter of the hole in the separator membrane after the hot tip probe is removed. Minimal propagation of a hole in the separator membrane from contact with the hot tip probe simulates the desired response of the separator membrane to a localized hot spot which may occur during an internal short circuit in Li-ion cells.

ER (Electrical Resistance): The units of electrical resistance are ohm-cm$^2$. The separator resistance is characterized by cutting small pieces of separators from the finished material and then placing them between two blocking electrodes. The separators are saturated with the battery electrolyte with 1.0 M LiPF$_6$ salt in EC/EMC solvent of 3:7 ratio by volume. The Resistance, R, in Ohms ($\Omega$), of the separator is measured by a 4-probe AC impedance technique. In order to reduce the measurement error on the electrode/separator interface, multiple measurements are needed by adding more layers. Based on the multiple layer measurements, the electric (ionic) resistance, $R_s$ ($\Omega$), of the separator saturated with electrolyte is then calculated by the formula $R_s=p_s l/A$ where $p_s$ is the ionic resistivity of the separator in $\Omega$-cm, A is the electrode area in cm$^2$ and 1 is the thickness of the separator in cm. The ratio $p_s/A=$ is the slope calculated for the variation of the separator resistance ($\Delta R$) with multiple layers ($\Delta\delta$) which is given by slope=$p_s/A=\Delta R/\Delta\delta$.

e-TMA: Expansion-Thermomechanical Analysis method measures the dimensional change of a separator membrane under load in the X (Machine direction) and Y (Transverse direction) directions as a function of temperature. A sample size of 5-10 mm in length and 5 cm in width is held in mini-Instron-type grips with the sample under constant 1 gram tension load. The temperature is ramped at 5 deg C./minute until the film reaches its melt rupture temperature. Typically, upon raising the temperature, separators held under tension show shrinkage, then start to elongate and finally break. The shrinkage of separator is indicated by a sharp dip downward in the curve. The increase in the dimension indicates the softening temperature and the temperature at which the separator breaks apart is the rupture temperature.

Hot ER: Hot Electrical Resistance is a measure of resistance of separator film while the temperature is linearly increased. The rise in resistance measured as impedance corresponds to a collapse in pore structure due to melting or "shutdown" of the separator membrane. The drop in resistance corresponds to opening of the separator due to coalescence of the polymer; this phenomenon is referred to as a loss in "melt integrity". When a separator membrane has a sustained high level of electrical resistance beyond 200 deg C., this is indicative that the separator membrane may prevent electrode shorting in a battery beyond 200 deg C.

In accordance with at least selected embodiments of the present invention, one may use the above tests and/or properties of Tables 1 and 2 to measure or test a potential high temperature separator or composite to see if it may be or may qualify as a high temperature melt integrity (HTMI) separator. If it passes the above tests, then, one may test the separator in a battery, cell or pack to be certain it is a high temperature melt integrity (HTMI) separator and that it preferably will at least keep the electrodes separated at a temperature of at least about 160 deg C., preferably at least 180 deg C., more preferably at least 200 deg C., still more preferably at least 220 deg C., and most preferably at least 250 deg C.

In accordance with at least selected embodiments of the present invention, if the high temperature separator passes the above tests of Tables 1 and 2, this is a good indicator that the separator may be or may qualify as a high temperature melt integrity (HTMI) separator.

In accordance with at least a selected embodiment of the present invention, a good indicator or initial test procedure to see if a separator may be used as or may qualify as a high temperature melt integrity (HTMI) battery separator, includes the steps of:
 1) running the above separator Thickness, Gurley, Tensile, Puncture, Shrinkage, Hot Tip, ER, e-TMA, and Hot ER tests on the separator, and if it passes, then
 2) running cell or battery tests on the separator to be certain.

In accordance with at least a selected embodiment of the present invention, one may measure or test a high temperature polymer, filler, coating, layer, or separator to see if it may be or may qualify for use in or as a high temperature separator or as a high temperature melt integrity (HTMI) coating, layer or separator, by the method of:
 1) checking the polymer (or polymers) and filler (or fillers, if any) of the high temperature coating, layer or stand alone separator to see that they each have a melt temperature or degradation temperature of at least about 160 deg C., preferably at least 180 deg C., more preferably at least 200 deg C., still more preferably 220 deg C., and most preferably at least 250 deg C.;
 2) checking the polymer (or polymers) and filler (if any) of the high temperature coating, layer or stand alone separator to see that they each do not dissolve in the electrolyte of the intended battery for the separator;
 3) measuring the shrinkage of the stand alone or complete separator (including the high temperature coatings or layers) to ensure it is less than about 15% at 150 deg C., preferably less than 10% at 150 deg C., more preferably less than 7.5% at 150 deg C., and most preferably less than 5% at 150 deg C.; and,
 4) if the high temperature coating, layer, stand alone separator, and complete separator pass the three tests above, then, testing the stand alone or complete separator in a battery, cell or pack to be certain it is a high melt temperature separator or high temperature melt integrity (HTMI) separator and that it will at least keep the electrodes separated at a temperature of at least about 160 deg C., preferably at least 180 deg C., more preferably at least 200 deg C., still more preferably at least 220 deg C., and most preferably at least 250 deg C.

If the high temperature coating, layer, stand alone separator, and complete separator pass the three tests above, this is a good indicator that the stand alone or complete separator (including the high temperature coatings or layers) may be or may qualify as a high melt temperature separator or high temperature melt integrity (HTMI) separator, but to be certain the stand alone or complete separator should be tested in a battery, cell, or pack.

In accordance with at least a selected embodiment of the present invention, a good indicator or initial test to see if a high temperature coating, layer or stand alone high temperature separator may be used as, may be used in, or may qualify as a high melt temperature separator or high temperature melt integrity (HTMI) coating, layer or separator, includes the steps of:
 1) checking the polymer (or polymers) and filler (if any) of the high temperature coating, layer or stand alone separator to see that they each have a melt temperature, degradation temperature, melting point, decomposition temperature, or Tg of at least about 180 deg C., preferably at least 200 deg C., more preferably at least 220 deg C., and most preferably at least 250 deg C.;

2) checking the polymer (or polymers) and filler (if any) of the high temperature coating, layer or stand alone separator to see that they each do not dissolve in the electrolyte of the intended battery for the separator; and, 3) measuring the shrinkage of the stand alone or complete separator (including the high temperature coatings or layers) to ensure the shrinkage is less than about 15% at 150 deg C., preferably less than 10% at 150 deg C., more preferably less than 7.5% at 150 deg C., and most preferably less than 5% at 150 deg C.

If the high temperature coating, layer, stand alone separator, and complete separator pass the three tests above, this is a good indicator or initial test that the high temperature coating, layer, stand alone separator, or complete separator may be used as, may be used in, or may qualify as a high melt temperature separator or high temperature melt integrity (HTMI) coating, layer or separator, and that the separator may at least keep the electrodes separated at a temperature of at least about 160 deg C., preferably at least 180 deg C., more preferably at least 200 deg C., still more preferably at least 220 deg C., and most preferably at least 250 deg C. To be certain, one should test the stand alone or complete separator in a battery, cell or pack.

Adding filler or particles to the high temperature polymer coating or layer can make it easier to form pores as the spaces or voids between the filler or particles help form the pores, may reduce cost, etc. However, adding filler or particles to the high temperature polymer coating material or batch can make polymer processing more difficult. As such it is possibly preferred to not add filler or particles to keep the processing simpler and to use the bath (see FIG. 1) to form the pores.

As the HTMI separator need only keep the electrodes separated for a short time, in accordance with at least certain embodiments of the invention, one may use a high Tg polymer, a polymer or material that does not melt, a polymer or material that melts or flows slowly, a cross-linked polymer or material, or other material, blend or mixture that will keep the electrodes separated long enough to allow the battery control circuitry to shut off the battery.

In at least one embodiment, there is provided a separator with a high melt temperature, preferably >160 deg C. and more preferably >180 deg C., that has the high level of dimensional and/or structural integrity needed to prevent contact between the anode and cathode when the battery is maintained at elevated temperatures for a period of time. In this embodiment, it is highly desirable to have such a separator with a high level of dimensional and structural integrity. Such a separator is referred to as a high temperature melt integrity (HTMI) separator. This separator is a high melt temperature battery separator including a porous membrane, film or base coated with a high glass transition temperature (Tg) polymer (also referred to as a binder).

In at least another embodiment, there is provided a stand alone porous membrane made using a high Tg polymer. This high temperature separator has a high melt temperature, preferably >160 deg C. and more preferably >180 deg C., has a high level of dimensional and/or structural integrity needed to prevent contact between the anode and cathode when the battery is maintained at elevated temperatures for a period of time, and may shut-down or may allow for ionic flow between the anode and cathode when the battery is maintained at elevated temperatures for a period of time. In this embodiment, it is highly desirable to have such a separator with a high level of dimensional and structural integrity. Such a separator is referred to as a high temperature melt integrity (HTMI) separator with or without shutdown. This separator preferably does not melt or melt down, and may continue to partially or fully function at high temperatures.

At least selected embodiments are directed to:

- A high melt temperature microporous Lithium-ion rechargeable battery separator, separator membrane, and the like that preferably prevents contact between the anode and cathode when the battery is maintained at elevated temperatures for a period of time.
- A method of making or using one or more high melt temperature microporous Lithium-ion rechargeable battery separators, separator membranes, and the like that preferably prevent contact between the anode and cathode when the battery is maintained at elevated temperatures for a period of time.

A Lithium-ion rechargeable battery including one or more high melt temperature microporous Lithium-ion rechargeable battery separators, separator membranes, and the like (with or without shutdown) that preferably prevent contact between the anode and cathode when the battery is maintained at elevated temperatures for a period of time.

A shutdown Lithium-ion rechargeable battery separator that that preferably prevents contact between the anode and cathode when the battery is maintained at elevated temperatures for a period of time.

A Lithium-ion rechargeable battery, cell, pack, accumulator, capacitor, or the like including one or more high melt temperature separators, separator membranes, and the like, that preferably prevents contact between the anode and cathode when the battery is maintained at elevated temperatures for a period of time, and wherein the battery, cell, pack, or the like may be of any shape, size and/or configuration, such as cylindrical, flat, rectangular, large scale Electric Vehicle (EV), prismatic, button, envelope, box, and/or the like.

A separator, separator membrane, or the like for a Lithium-ion rechargeable battery that is capable of at least partial functioning at high temperatures, for example, at about 160 deg C. or more, at about 180 deg C. or more, or higher, for at least a short period of time, wherein the partial functioning includes keeping the electrodes (anode and cathode) physically separated.

A high melt temperature separator that shuts down at about 130 deg C., but keeps the electrodes (anode and cathode) physically separated at about 160 deg C.

A microporous battery separator that includes at least one layer or component having a high melt temperature.

A high temperature separator having a high melt temperature, preferably >160 deg C. and more preferably >180 deg C., and having a high level of dimensional or structural integrity needed to prevent contact between the anode and cathode when the battery is maintained at elevated temperatures for a period of time.

A high temperature melt integrity (HTMI) separator with a high level of dimensional or structural integrity.

A high melt temperature battery separator including a porous membrane coated with a high glass transition temperature (Tg) polymer or blend (also referred to as a binder) on at least one side thereof.

A stand alone (single or multi-ply) porous membrane made using a high Tg polymer or blend.

A high melt temperature microporous Lithium-ion rechargeable battery separator or membrane that is capable of retaining its physical structure up to 250 deg C. in a Lithium-ion rechargeable battery (cell, pack, battery, accumulator, capacitor, or the like).

The separator or membrane above, composed of one or more polymers which have a glass transition temperature ($T_g$) greater than 165 deg C., preferably greater than 180 deg C., more preferably at least 250 deg C., and which is soluble in at least one moderately volatile solvent.

The separator or membrane above, composed of a single or double sided high Tg polymer coating applied to a microporous base membrane or of a free standing high Tg polymer microporous separator or membrane.

The separator or membrane above, with the high Tg polymer coated onto a microporous base membrane made of a thermoplastic polymer, the thermoplastic polymers include, but are not limited to, polyolefins such as polyethylene, polypropylene, polymethylpentene, and blends, mixtures, or combinations thereof.

The separator or membrane above, wherein such microporous base membranes are manufactured by a dry stretch process (known as the Celgard® dry stretch process), by a wet process also known as a phase separation or extraction process, by a particle stretch process, or the like.

The separator or membrane above, wherein the base membrane may be a single layer (one or more plies) or multi-layer membrane, such as a tri-layer membrane e.g., Polypropylene/Polyethylene/Polypropylene (PP/PE/PP) or Polyethylene/Polypropylene/Polyethylene (PE/PP/PE), bi-layer membrane (PP/PE or PE/PP), or the like.

The separator or membrane above, wherein the base membrane or film, such as Polypropylene, may optionally be pre-treated in order to alter the surface characteristics of the membrane and improve the adhesion of the high Tg polymer coating to the base membrane.

The separator or membrane above, wherein the pre-treatments may include, but are not limited to, priming, stretching, corona treatment, plasma treatment, and/or coating, such as surfactant coatings on one or both sides thereof.

The separator or membrane above, wherein the high Tg polymer may be applied by a coating step followed by an immersion step, and wherein the high Tg coated membrane is immersed into a gelation bath to both precipitate the high Tg polymer and to remove the solvent for high Tg polymer in order to form a high Tg porous coating or layer.

The separator or membrane above, wherein the high Tg polymer may be applied by a coating step followed by an immersion step wherein the high Tg coated membrane is immersed into a bath to precipitate the high Tg polymer.

The separator or membrane above, wherein the high Tg polymer is polybenzimidazole (PBI). The separator or membrane above, wherein the high temperature coating or layer comprises polybenzimidazole (PBI) and fumed Alumina.

The separator or membrane above, wherein the coating was applied as a coating solution or slurry of PBI, Alumina particles, and DMAc.

A high melt temperature electrospun coated microporous Lithium-ion rechargeable battery separator, separator membrane, and the like that preferably prevents contact between the anode and cathode when the battery is maintained at elevated temperatures for a period of time.

A method of making or using one or more high melt temperature electrospun coated microporous Lithium-ion rechargeable battery separators, separator membranes, and the like that preferably prevent contact between the anode and cathode when the battery is maintained at elevated temperatures for a period of time.

A Lithium-ion rechargeable battery including one or more high melt temperature electrospun coated microporous Lithium-ion rechargeable battery separators, separator membranes, and the like that preferably prevent contact between the anode and cathode when the battery is maintained at elevated temperatures for a period of time.

A Lithium-ion rechargeable battery that is capable of functioning at high temperatures, preferably including components such as an electrospun coated microporous battery separator or separator membrane that preferably functions at high temperatures.

An improved electrospun battery separator for at least certain high temperature applications, for a high melt temperature electrospun coated microporous Lithium-ion rechargeable battery separator, separator membrane, and the like that preferably prevents contact between the anode and cathode when the battery is maintained at elevated temperatures for a period of time, for methods of making and/or using such separators, separator membranes, and the like, and/or for Lithium-ion rechargeable batteries including one or more such separators, separator membranes, and the like.

A Lithium-ion rechargeable battery, cell, pack, accumulator, capacitor, or the like including one or more high temperature electrospun coated separators, separator membranes, and the like, wherein the Lithium-ion rechargeable battery, cell, pack, or the like may be of any shape, size and/or configuration, such as cylindrical, flat, rectangular, large scale Electric Vehicle (EV), prismatic, button, envelope, box, and/or the like.

An electrospun coated separator, separator membrane, or the like for a Lithium-ion rechargeable battery that is capable of functioning at high temperatures, for example, at about 160 deg C. or more, at about 180 deg C. or more, or higher, for at least a short period of time, wherein "functioning" may include keeping the electrodes (anode and cathode) physically separated, allowing ionic flow between the electrodes, or both.

An electrospun coated high temperature separator that shuts down at about 130 deg C., but keeps the electrodes (anode and cathode) physically separated at about 160 deg C., that allows ionic flow between the electrodes at about 160 deg C. (does not shutdown at 130 deg C.), or both.

An electrospun coated microporous battery separator that functions at high temperatures, does not melt at high temperatures, has a high melt temperature, includes at least one layer or component having a high melt temperature, and/or the like.

An electrospun coated high temperature separator having a high melt temperature, preferably >160 deg C. and more preferably >180 deg C., and having a high level of dimensional or structural integrity needed to prevent contact between the anode and cathode when the battery is maintained at elevated temperatures for a period of time.

An electrospun coated high temperature melt integrity (HTMI) separator with a high level of dimensional or structural integrity.

A high melt temperature microporous Lithium-ion rechargeable battery separator or membrane that is electrospun coated with a PBI on at least one side thereof.

The electrospun coated separator or membrane above composed of a single or double sided PBI electrospun coating applied to a microporous base membrane.

The electrospun coating above that consists of PBI or a blend of PBI with one or polymers including polyamides, polyaramids, polyimides, polyamideimides, polyvinylidene fluoride or co-polymers of polyvinylidene fluoride and blends, mixtures and/or combinations thereof.

The electrospun coating above that is composed of PBI that is at least 4 μm in thickness, preferably at least 5 μm in thickness, more preferably at least 6 μm in thickness, and most preferably at least 7 μm in thickness.

The electrospun coating above that is composed of PBI or a blend of PBI with one or polymers including polyamides, polyaramids, polyimides, polyamideimides, polyvinylidene fluoride or co-polymers of polyvinylidene fluoride and blends, mixtures and/or combinations thereof that is at least that is at least 4 μm in thickness, preferably at least 5 μm in thickness, more preferably at least 6 μm in thickness, and most preferably at least 7 μm in thickness.

The electrospun coating above that is composed of PBI or a blend of PBI with one or polymers including polyamides, polyaramids, polyimides, polyamideimides, polyvinylidene fluoride or co-polymers of polyvinylidene fluoride and blends, mixtures and/or combinations thereof that has an Add-on of at least 2.0 to 6.0 g/m$^2$, more preferably 2.2 to 5.0 g/m$^2$, and most preferably 2.5 to 5.0 g/m$^2$.

The separator or membrane above with the PBI electrospun coated onto a microporous base membrane made of a thermoplastic polymer, the thermoplastic polymers include, but are not limited to, polyolefins such as polyethylene, polypropylene, polymethylpentene, and blends, mixtures, or combinations thereof.

The separator or membrane above having such microporous base membranes manufactured by a dry stretch process (known as the Celgard® dry stretch process), by a wet process also known as a phase separation or extraction process, by a particle stretch process, or the like.

The separator or membrane above wherein the base membrane may be a single layer polypropylene or polyethylene (one or more plies) or multi-layer membrane, such as a tri-layer membrane e.g., Polypropylene/Polyethylene/Polypropylene (PP/PE/PP) or Polyethylene/Polypropylene/Polyethylene (PE/PP/PE), bi-layer membrane (PP/PE or PE/PP), or the like. The separator or membrane above wherein the base membrane or film, such as Polypropylene, may optionally be pre-treated in order to alter the surface characteristics of the membrane and improve the adhesion of the electrospun PBI coating to the base membrane.

The separator or membrane above wherein the pre-treatments may include, but are not limited to, priming, stretching, corona treatment, plasma treatment, and/or coating, such as surfactant coating(s) on one or both sides thereof.

Disclosed or provided are high melt temperature microporous Lithium-ion rechargeable battery separators, shutdown high melt temperature battery separators, battery separators, membranes, composites, and the like that preferably prevent contact between the anode and cathode when the battery is maintained at elevated temperatures for a period of time, methods of making, testing and/or using such separators, membranes, composites, and the like, and/or batteries, Lithium-ion rechargeable batteries, and the like including one or more such separators, membranes, composites, and the like.

High melt temperature microporous battery separators, shutdown high melt temperature battery separators, battery separators, membranes, films, composites, coatings, layers, components, and the like that preferably prevent contact between the anode and cathode when the battery is maintained at elevated temperatures for a period of time, methods of making, testing and/or using such separators, membranes, films, composites, coatings, layers, components, and the like, and/or batteries, Lithium-ion rechargeable batteries, and the like including one or more such separators, membranes, films, composites, coatings, layers, components, and the like as claimed, shown or described herein.

The invention is not limited by the above description or examples.

The invention claimed is:

1. A high melt temperature microporous battery separator for a lithium-ion rechargeable battery comprising:
   a microporous membrane, said microporous membrane being a stretched thermoplastic polymer film or sheet, said thermoplastic polymer consisting of a polyolefin selected from the group consisting of: polyethylene, polypropylene, polymethylpentene, and combinations thereof; and
   a coating on at least one entire side of said microporous membrane comprising a high glass transition temperature ($T_g$) polymer, wherein said high glass transition temperature ($T_g$) polymer being polybenzimidazole (PBI) or blends of PBI with one or more other polymers, said coating has a dimensional or structural integrity to prevent contact between an anode and a cathode of the lithium-ion rechargeable battery, and prevents contact between the anode and cathode when the lithium-ion rechargeable battery is maintained at elevated temperatures for at least a period of time.

2. The high melt temperature microporous battery separator of claim 1 wherein said high glass transition temperature ($T_g$) polymer having a glass transition temperature ($T_g$) greater than 165° C.

3. The high melt temperature microporous battery separator of claim 1 wherein said high glass transition temperature ($T_g$) polymer having a glass transition temperature ($T_g$) greater than 180° C.

4. The high melt temperature microporous battery separator of claim 1 wherein said high glass transition temperature ($T_g$) polymer having a glass transition temperature ($T_g$) of at least 250° C.

5. The high melt temperature microporous battery separator of claim 1 wherein said high glass transition temperature ($T_g$) polymer being soluble in at least one volatile solvent.

6. The high melt temperature microporous battery separator of claim 1 wherein said other polymers being selected from the group consisting of: polyimides, polyamideimides, polysulfones, polyketones, and combinations thereof.

7. The high melt temperature microporous battery separator of claim 1 wherein said coating further comprising fumed alumina.

8. The high melt temperature microporous battery separator of claim 1, wherein the coating was applied as a coating solution or slurry of PBI, alumina particles, and DMAc.

9. The high melt temperature microporous battery separator of claim 1, wherein said microporous membrane being at least one of a polyolefin membrane, a polypropylene membrane, a polyethylene membrane, and a trilayer separator.

10. The high melt temperature microporous battery separator of claim 1 wherein said microporous membrane being manufactured by a dry stretch process or a wet process.

11. The high melt temperature microporous battery separator of claim 1 wherein said microporous membrane being a single layer membrane, a bi-layer membrane, a tri-layer membrane, or a multi-layer membrane.

12. The high melt temperature microporous battery separator of claim 1, wherein said microporous membrane having a pre-treatment adapted for altering the surface characteristics of the membrane and improving the adhesion of the high $T_g$ polymer coating to the membrane, wherein said pre-treatment being on one or both sides of said microporous membrane and being selected from the group consisting of: priming, stretching, corona treatment, plasma treatment, coating such as surfactant coatings, and combinations thereof.

13. The high melt temperature microporous battery separator of claim 1, wherein said high $T_g$ polymer coating being applied to said microporous membrane by one of:

a coating step followed by an immersion step, and wherein the high $T_g$ coated membrane is immersed into a gelation bath to both precipitate the high $T_g$ polymer and to remove the solvent for high $T_g$ polymer in order to form a high $T_g$ porous coating or layer, or a coating step followed by an immersion step wherein the high $T_g$ coated membrane is immersed into a bath to precipitate the high $T_g$ polymer.

14. The high melt temperature microporous battery separator of claim 1 wherein said battery separator having a melt temperature of >160° C.

15. The high melt temperature microporous battery separator of claim 1 wherein said battery separator having a melt temperature of >250° C.

16. The high melt temperature microporous battery separator of claim 1, wherein the coating was applied as a plurality of high glass transition temperature ($T_g$) polymer nanofibers being electrospun onto at least one side of said microporous membrane.

17. In a lithium-ion rechargeable battery, the improvement comprising the high melt temperature microporous battery separator of claim 1.

18. The high melt temperature microporous battery separator of claim 1, wherein said coating on at least one side of said microporous membrane comprising a plurality of polymer nanofibers on said microporous membrane, said polymer having a glass transition temperature ($T_g$) of at least 160° C.

19. The high melt temperature microporous battery separator of claim 1, wherein said microporous membrane comprising a polymer or blend, said polymer or blend having a glass transition temperature ($T_g$) of at least 160° C.;

whereby, said microporous membrane being capable of retaining its physical structure up to 250° C. in a lithium-ion rechargeable battery, cell, pack, battery, accumulator, or capacitor.

20. A battery comprising the battery separator of claim 1.

* * * * *